US008329289B2

(12) United States Patent
Buri et al.

(10) Patent No.: US 8,329,289 B2
(45) Date of Patent: Dec. 11, 2012

(54) COMPOSITES OF INORGANIC AND/OR ORGANIC MICROPARTICLES AND NANO-CALCIUM CARBONATE PARTICLES

(75) Inventors: Matthias Buri, Rothrist (CH); Patrick A. C. Gane, Rothrist (CH); René Vinzenz Blum, St. Urban (CH)

(73) Assignee: Omya Development AG, Oftringen (CH)

( * ) Notice: Subject to any disclaimer, the term of this patent is extended or adjusted under 35 U.S.C. 154(b) by 58 days.

(21) Appl. No.: 12/315,483

(22) Filed: Dec. 3, 2008

(65) Prior Publication Data
US 2009/0162638 A1 Jun. 25, 2009

Related U.S. Application Data

(63) Continuation-in-part of application No. PCT/EP2007/055506, filed on Jun. 5, 2007.

(30) Foreign Application Priority Data

Jun. 9, 2006 (DE) .......................... 10-2006-026965

(51) Int. Cl.
*B32B 19/02* (2006.01)
*B32B 5/16* (2006.01)
*C08K 3/26* (2006.01)

(52) U.S. Cl. ........ 428/323; 428/403; 428/407; 524/451; 524/445; 524/425; 977/773; 516/100

(58) Field of Classification Search .................. 428/403, 428/363, 407; 427/411; 524/425, 451, 445; 106/464, 465; 977/773
See application file for complete search history.

(56) References Cited

U.S. PATENT DOCUMENTS

| | | | |
|---|---|---|---|
| 4,187,192 A * | 2/1980 | Sheridan | ......................... 516/79 |
| 4,219,365 A | 8/1980 | Dietz et al. | |
| 4,547,331 A | 10/1985 | Batstra | |
| 4,952,278 A * | 8/1990 | Gregory et al. | ............... 162/141 |
| 5,076,846 A | 12/1991 | Buri et al. | |
| 5,120,365 A | 6/1992 | Kogler | |
| 5,152,835 A | 10/1992 | Nemeh | |
| 5,169,441 A * | 12/1992 | Lauzon | ......................... 106/416 |
| 5,229,094 A | 7/1993 | Clauss et al. | |

(Continued)

FOREIGN PATENT DOCUMENTS

DE 33 12778 A1 11/1983
(Continued)

OTHER PUBLICATIONS

Yang, Y.E., Gai, G.S., Hao, X.Y., Chen, Q.R. Journal of Materials Processing Technology, vol. 170, p. 58-63, 2005.*

(Continued)

*Primary Examiner* — Satya Sastri

(74) *Attorney, Agent, or Firm* — Amster, Rothstein & Ebenstein LLP

(57) ABSTRACT

The present invention relates to composites, comprising inorganic and/or organic pigments and/or fillers in the form of microparticles, the surface of which is coated at least partially with finely divided nano-calcium carbonate with the help of binders based on copolymers comprising as monomers one or more dicarboxylic acids and one or more monomers from the group of diamines, triamines, dialkanolamines or trialkanolamines, a method for producing such composites, aqueous slurries thereof and their use in papermaking or in the field of paint and plastic production and the use of the inventive binders for coating the microparticles with nano-calcium carbonate.

74 Claims, 11 Drawing Sheets

U.S. PATENT DOCUMENTS

| | | | |
|---|---|---|---|
| 5,344,487 A | | 9/1994 | Whalen-Shaw |
| 5,401,482 A | | 3/1995 | Clauss et al. |
| 5,439,558 A | | 8/1995 | Bergmann et al. |
| 5,449,402 A | | 9/1995 | Whalen-Shaw |
| 5,454,864 A | | 10/1995 | Whalen-Shaw |
| 5,472,498 A | | 12/1995 | Stephenson et al. |
| 5,509,960 A | | 4/1996 | Simpson |
| 5,554,215 A | | 9/1996 | Simpson |
| 5,562,978 A | * | 10/1996 | Jacobson ............... 428/323 |
| 5,584,924 A | | 12/1996 | Arrington-Webb et al. |
| 5,605,568 A | | 2/1997 | Naydowski et al. |
| 5,662,731 A | | 9/1997 | Andersen et al. |
| 5,886,069 A | * | 3/1999 | Bolt ............... 523/223 |
| 6,143,064 A | * | 11/2000 | Virtanen ............... 106/449 |
| 6,376,578 B1 | * | 4/2002 | Gorzynski et al. ............... 523/420 |
| 6,414,074 B1 | * | 7/2002 | Blum ............... 524/507 |
| 6,511,536 B1 | * | 1/2003 | Noguchi et al. ............... 106/417 |
| 6,666,953 B1 | | 12/2003 | Gane et al. |
| 7,727,323 B2 | * | 6/2010 | Tarng et al. ............... 106/428 |
| 2001/0033820 A1 | * | 10/2001 | Yaniv ............... 423/432 |
| 2003/0114631 A1 | * | 6/2003 | Walton et al. ............... 528/106 |
| 2004/0020410 A1 | * | 2/2004 | Gane et al. ............... 106/464 |
| 2004/0255820 A1 | * | 12/2004 | Chen et al. ............... 106/31.13 |
| 2005/0006041 A1 | * | 1/2005 | Gane et al. ............... 162/135 |
| 2005/0287313 A1 | | 12/2005 | Chen et al. |
| 2006/0045997 A1 | | 3/2006 | Hladik et al. |
| 2007/0185258 A1 | | 8/2007 | Suau et al. |
| 2007/0249758 A1 | | 10/2007 | Suau et al. |
| 2009/0169894 A1 | * | 7/2009 | Buri et al. ............... 428/407 |
| 2010/0297426 A1 | * | 11/2010 | Gane et al. ............... 428/315.5 |

FOREIGN PATENT DOCUMENTS

| | | | |
|---|---|---|---|
| EP | 1 072 650 A1 | | 1/2001 |
| FR | 2 256 061 | | 4/1983 |
| GB | 839712 | | 6/1960 |
| JP | 59-120657 | | 7/1984 |
| JP | 9-132514 | | 5/1997 |
| JP | 22-42998 | | 2/2010 |
| WO | WO 92/02468 | | 2/1992 |
| WO | WO 92/08755 A | | 5/1992 |
| WO | WO 96/28517 | | 9/1996 |
| WO | WO 97/32934 A | | 9/1997 |
| WO | WO 99/52984 | | 10/1999 |
| WO | WO-01/00712 A1 | * | 1/2001 |
| WO | WO 03/078734 A | | 9/2003 |
| WO | WO 2006/109168 A2 | | 10/2006 |
| WO | WO 2006/109171 A1 | | 10/2006 |
| WO | WO 2007/141260 A1 | | 12/2007 |

OTHER PUBLICATIONS

Certified Priority Doc. DE 102000602695.9, Jun. 28, 2007.*
Yang et al., "Nanostructured Modification of Mineral Particle Surfaces in Ca(OH)2-H2)-CO2 System." Journal of Materials Processing Technology, 170:1-2, pp. 58-63, Dec. 2005.
The International Search Report for PCT Application No. PCT/EP2007/055506.
The Written Opinion for PCT Application No. PCT/EP2007/055506.
USPTO Office Action dated Feb. 21, 2012 in connection with U.S. Appl. No. 12/227,031.

* cited by examiner

COMPOSITES OF INORGANIC AND/OR ORGANIC MICROPARTICLES AND NANO-CALCIUM CARBONATE PARTICLES

This is a Continuation-in-Part of PCT Application No. PCT/EP2007/055506, filed Jun. 5, 2007, which claims priority to German Application No. 102006026965.9, filed Jun. 9, 2006, the content of which is hereby incorporated by reference in its entirely.

The present invention relates to composites, comprising inorganic and/or organic pigments and/or fillers in the form of microparticles whose surface is coated with the help of binders at least partially with finely divided calcium carbonate particles in the nanometer range, a method for producing such composites, aqueous slurries thereof and use thereof in papermaking or in the field of production of paints and plastics as well as the use of the inventive binders for coating microparticles with nano-calcium carbonate.

Pigments and/or fillers based on calcium carbonate particles in the nanometer range (so-called nanoparticles) are known and are used in numerous applications including paper, paint and plastics applications. Organic and/or inorganic pigments and/or fillers in the micrometer range (so-called microparticles) such as hollow spheres or solid particles based on polystyrene, and inorganic mineral particles such as talc- or mica-based pigments and/or fillers are also known and are used in the same or similar applications.

Mixtures of nanoparticles and microparticles of different chemical compositions are used because they have certain different properties which are advantageous to combine to impart the desired properties to the end product, e.g., paper. Mixtures of such substances are used, e.g., as pigments or fillers in papermaking but especially in paper finishing as in coating, e.g., to improve the quality of the paper with regard to the opacity, whiteness and gloss of the paper or the printability and printing properties. It is known that the properties of such microparticles and nanoparticles with regard to retention in papermaking and coating "holdout" in paper finishing, e.g., paper coating can be combined advantageously. Coating holdout is understood by those skilled in the art to refer to whether the coating remains on the paper surface or penetrates partially to completely into the paper surface or whether a portion, e.g., the binder and/or a pigment or a partial fraction of a pigment is segregated from the whole and penetrates into the paper surface. This is a problem with which those skilled in the art are familiar, especially in coating an absorbent substrate using coating colours with a low solids content.

When using mixtures of such microparticles and nanoparticles in such applications, an unwanted separation of components, so-called segregation, unfortunately occurs frequently and is associated with an uneven distribution of the coating with regard to the coating thickness on the surface underneath, the underlying pre-coating or the paper surface, which may thus lead to an uneven printing on the paper, for example. The term "segregation" refers to the process of separation of different elements in an observation field with a tendency toward spatial distribution of the elements according to certain properties.

Segregation of pigment and/or filler mixtures results in differences in pore volume in the coating, e.g., in finishing the paper by coating, because the free nanoparticles become segregated from the microparticles and therefore may either occupy the pores of the paper and/or the coating or "float" there, i.e., collect primarily in the upper area of the coating, for example, which is important in particular when the coating should absorb a certain volume of liquid such as water, oil and/or organic solvents from the printing ink in the subsequent printing.

A number of such mixtures, their production and use are known in the state of the art.

A widely used technique for producing such pigment or filler mixtures is described in DE 33 12 778 A1 and DE 43 12 463 C1, for example, and consists of mixing and joint grinding of a mineral filler such as natural calcium carbonate with a mineral filler such as talc.

However, under the conditions of papermaking or coating, such mixtures are usually subject to segregation because the bonds between the components of the mixture often do not withstand these conditions. It is known that shear rates of more than $10^6$ $sec^{-1}$ may occur in coating with the doctor blade at 1500 m/min.

Therefore, additional methods for producing such composites have been developed based on crosslinking between the pigment and/or filler particles, where numerous internal cavities are formed that should improve the physical properties and especially the optical properties of the pigments and/or fillers.

Thus, a method for forming chemically aggregated porous pigment composites is described in WO 92/08755, where an aqueous slurry of mineral particles such as calcium carbonate is prepared and a polymer or copolymer containing carboxylic acid groups is added to the slurry to cause flocculation. Calcium ions are added in excess to the slurry to induce precipitation of the calcium salt of the polymer on the mineral flocks and therefore produce aggregates of the mineral particles that are bonded by the calcium salt and have a porous flaky structure. The excess calcium ions are reacted with carbon dioxide and precipitated as calcium carbonate on the polymeric calcium salt. However, since the calcium ions are added in the form of alkaline chemical compounds such as calcium hydroxide, they form alkaline intermediates that can have negative effects, e.g., when using certain dispersants. In addition, further precipitation of calcium carbonate alters the structure of the original nanoparticle/microparticle structure and necessarily leads to the introduction of another pigment, namely the precipitated calcium carbonate formed by neutralization. Flocculated aggregates can be problematical in general in paper applications because they cause diffuse light scattering on the surface which leads to loss of the paper gloss. In addition, the pore volume of the composite to be achieved originally is influenced and altered first by the flocculation and secondly by the precipitated calcium carbonate thus formed.

U.S. Pat. No. 5,449,402 describes functionally modified pigment particles that are produced by mixing of flocculated pigments such as calcium carbonate with a regulator substance having an opposite charge from the charge of the flocculated pigment. The flocculated pigment is preferably an aqueous suspension of filter cake particles. Preferred regulator substances include water-insoluble or dispersible latex binders, water-soluble or alkali-soluble organic and/or inorganic polymer binders and non-film-forming organic particles that are electrostatically bound to the pigment particles when mixed with them.

U.S. Pat. No. 5,454,864, U.S. Pat. No. 5,344,487 and EP 0 573 150 also describe pigment composites whose production is based on electrostatic attraction forces between the carrier particles and the coating particles. However, the use of such composites may be problematical in the respective applications because of interactions with other charged components.

Another method for improving whiteness according to WO 97/32934 consists of coating the pigment particles with other pigment particles such as finely divided particles of precipitated calcium carbonate which are initially present in the form of agglomerates, but without using a binder, which can lead to the problems mentioned above such as flocculation. The stability of these composites is based essentially on the forces of attraction such as van der Waals forces that can develop only when certain very specific conditions are met. For example a defined pH must be maintained exactly to obtain the best possible zeta potential, which is different for each combination of substances. As soon as the conditions deviate from the optimal, the forces of repulsion become predominant and the components undergo segregation.

WO 99/52984 pertains to composite compositions of costructured or coadsorbed fillers which contain at least two different types of mineral or organic fillers or pigments, e.g., from calcium carbonate, talc or polystyrene and use thereof. The different types of pigments or fillers have hydrophilic and/or organophilic regions which allow binding to take place by way of special binders. The binders, which must have an affinity for the hydrophilic components as well as the organophilic components to manifest their binding function, are selected from special polymers and/or copolymers. The particle diameter of the pigments and/or fillers used does not play a role here inasmuch as no diameter is mentioned explicitly and/or all the particle diameters mentioned in the examples are less than 1 µm in the best case. Thus the advantages of fillers or pigments and therefore the problems associated with them in the case of segregation are not discussed here.

WO 03/078734 discloses a composition for surface treatment, in particular for coating paper, containing a nanoparticle fraction, e.g., of precipitated calcium carbonate, and a carrier fraction comprising platelet-like pigment particles, including talc or plastic pigment particles and at least one binder. However, the nanoparticles do not coat the carrier. By targeted arrangement of the platelet-like microparticles on the paper surface, pores are closed and nanoparticles can no longer penetrate. It is describes how the platelet-like microparticles migrate to the paper surface due to segregation and thereby close pores between the fibres and thus prevent the nanoparticles from being able to penetrate into the surface. Thus targeted segregation of nanoparticles and microparticles is a goal. Microparticles segregate from the nanoparticles and are situated at the bottom of the coating while nanoparticles are at the top of the coating. The binder, preferably a polymer latex binder, causes the bond to form between individual particles and the two particle fractions at the top and bottom of the coating when the coating dries on the paper. The desired segregation has already taken place at this point in time.

US 2005/0287313 relates to the subject of fusible print media based on a substrate and an ink-absorbing layer on the substrate. The ink-absorbing layer comprises a plurality of hollow spheres, e.g., polystyrene hollow spheres which have essentially the same diameter which may be 0.3 to 10 µm. The layer also includes binders such as polyvinyl alcohol or polyvinylpyrrolidone and the like to bond the hollow spheres together. The hollow spheres may also be partially replaced by microporous and/or mesoporous inorganic particles such as calcium carbonate or talc as well as polymer particles that are not hollow and may have a diameter of 0.2 to 5 µm. US 2005/0287313 thus describes a mixture of microparticles that are present concurrently and held together by fixation in a binder tailored to the requirements of the melting process. It is a type of pickling bath which may consist of certain cationic polymers and copolymers containing amino groups and is fed to ensure a better chemical interaction between a dye-based ink and the ink absorbing layer. It does not play any role with regard to the binding of the different components within the layer. The problem of segregation is not mentioned.

WO 2006/016036 relates to, among other things, a method for grinding mineral materials in water in the presence of binders and the resulting suspensions as well as the use thereof in coating formulations. A large number of materials such as talc that can be ground in the presence of binders are mentioned in the description and claims. However, the examples use only calcium carbonates. In none of the examples grinding of, for example, two chemically different materials in the presence of a binder is disclosed. Furthermore, there is no mention of the fact that nanoparticles are formed or nanomicrocomposites are produced by this grinding method. The binder is not used to produce a composite but instead as a grinding aid for finer grinding, but the average diameter of the particles in the pigment suspensions may be up to 30 µm. The binders used for grinding may be based on styrene-acrylate or styrene-butadiene, i.e., these are binders with which those skilled in the art are well familiar such as those used in coating papers or as binders in wall paint. Thus, the method described in WO 2006/016036 obligatorily includes a grinding step which yields particles essentially in the micro range and it does not describe a binder that allows the formation of an essentially segregation-resistant composite.

The object of the present invention is thus to provide pigment and/or filler composites as well as aqueous slurries thereof which will have very good optical properties, e.g., with regard to opacity, whiteness and brightness or printing properties while at the same time being subject to no or essentially no segregation under the processing conditions to which they are exposed.

However, this object does not extend to the field of thermal paper, production and processing thereof, inasmuch as it pertains to composites from organic microparticles and inorganic nanoparticle components for papermaking and finishing methods.

Another object of the present invention is to provide a method for producing such composites, the use of these composites according to the present invention in papermaking and finishing, e.g., coating, but not in production and processing of thermal paper if it involves composites of organic microparticles and inorganic nanoparticle components. In addition, an object of the present invention is the use of the inventive composites in the production of paints or plastics, in sealing substances and the use of certain binders in coating pigment and/or filler microparticles with calcium carbonate nanoparticles.

The features defined in the independent claims are used to achieve these objects.

Advantageous embodiments of the present invention are derived from the subclaims and the following description.

The object of the invention is achieved by a composite, comprising inorganic and/or organic pigment and/or filler particles which are coated at least partially with a calcium carbonate composition, and a binder.

The binder consists of a copolymer comprising as monomers one or more dicarboxylic acids and one or more monomers from the group of diamines, triamines, dialkanolamines or trialkanolamines.

The inventive binder has especially good binder properties in combination with the microparticles and the nano-calcium carbonate compositions. A large portion of the nano-calcium carbonate composition used is permanently bound to the surface of the microparticle, which allows an open structure in use of the composite and thus allows a reduction in packing density and/or an increase in pore volume, among other things.

According to this invention, the spherical equivalent diameter of the pigment and/or filler particles is primarily in the micrometer range, while the spherical equivalent diameter of the calcium carbonate particles is primarily in the nanometer range.

A particle in the nanometer range is defined within the scope of this invention as a particle having a spherical equivalent diameter of less than or equal to 200 nm.

A microparticle is defined according to this invention as a particle having a spherical equivalent diameter of greater than 0.2 μm up to the micrometer range, e.g., about 0.3 to 100 μm, in particular from about 1 to about 25 μm.

The so-called spherical equivalent diameter is a measure of the size of an irregularly shaped particle. It is calculated from a comparison of a property of the irregular particle with a property of a regularly shaped particle. Depending on the choice of property used for comparison, a distinction is made between different equivalent diameters. In the present case the equivalent diameter is considered with respect to the sedimentation properties of the particles investigated.

The sedimentation and thus the equivalent diameter of the particles as well as their distribution are determined for the present invention by using the sedimentation method, i.e., a sedimentation analysis in a gravimetric field using the Sedigraph 5100 from the company Micromeritics, USA. Those skilled in the art are familiar with this method and this apparatus which are used throughout the world for determining the degree of fineness of fillers and pigments. Their measurement is performed in an aqueous solution of 0.1 wt % $Na_4P_2O_7$. The samples were dispersed using a high-speed stirrer and ultrasound.

In a preferred embodiment, the pigment microparticles and/or filler microparticles are inorganic particles, e.g., talc, mica or mixtures thereof. Calcium carbonate is not suitable as a microparticle according to this invention. Suitable talc qualities are distributed by MONDO Minerals, for example. Mica may also be used such as that available from Aspanger Bergbau und Mineralwerke GmbH, Austria, for example.

The pigment and/or filler particles preferably have an essentially spherical structure, in particular, a hollow spherical, hollow hemispherical or platelet-like structure, where "hemispherical" structure is understood to refer to any structure derived from a hollow sphere having a surface that is not closed. Platelet-like and hollow hemispherical micropigments and/or microfillers have proven to be especially advantageous because they have a good holdout due to their shape. Platelet-like particles are understood here to be particles in which the ratio of length to width and/or height is >1.

Inorganic microparticle pigments and/or fillers are preferably platelet-like.

The inventive pigment and/or filler particles may also be organic particles, however, e.g., based on polyethylene, polypropylene, polyethylene terephthalate, polystyrene or mixtures thereof. Organic pigments and/or fillers that can be used in the present invention include those distributed by Rohm & Haas, for example, under the brand name Ropaque, e.g., Ropaque HP-1055 or Ropaque AF-1353. The advantage of organic microparticles in the composite is derived, among other things, from the different physical properties such as density, conductivity and colour of organic materials in comparison with inorganic mineral substances.

In a preferred embodiment, the organic pigment particles and/or filler particles have an essentially spherical structure, preferably a hollow spherical or hollow hemispherical structure. In the case of hollow spherical particles, they may also contain liquids, e.g., water which may be removed from the hollow spheres in any additional physical steps such as drying, during and/or after use in the present invention. The advantage of hollow spheres lies in the lower specific gravity in comparison with filled spheres, among other things. Any object such as paper or plastic produced therefrom will therefore also be lighter, which may be an advantage in shipping for example. Due to the closed hollow sphere or open hollow hemisphere, the result is an increased amount of light scatter, which leads to an increased opacity, among other things. Also, the closed hollow sphere, e.g., filled with air, has a thermal insulation effect. This may be an advantage for use in interior and exterior wall paint and coatings on buildings.

In a preferred embodiment, the equivalent diameter of the pigment and/or filler particles is essentially in a range of more than 0.2 to about 100 μm, e.g., from about 0.3 to about 100 μm, preferably in a range from about 0.3 to about 75 μm, more preferably in a range from about 0.3 to about 50 μm, even more preferably in a range from about 0.3 to about 25 μm, most preferably in a range from about 0.3 to about 15 μm, in particular in a range from about 0.3 to about 12 μm.

The equivalent diameter of the organic pigment and/or filler particles is preferably in a range of more than 0.2 to 25 μm, more preferably in a range from 0.3 to about 10 μm, e.g., in a range from about 0.5 to about 1.5 μm, 0.25 to 1.5 μm or about 0.7 to about 1.1 μm, in particular from about 0.9 to about 1.0 μm.

Organic pigment and/or filler particles based on polystyrene, e.g., in the form of polystyrene hollow spheres having a spherical equivalent diameter of about 0.3 to about 2 μm, preferably about 0.7 to about 1.5 μm, especially preferably about 0.9 to about 1.1 μm, e.g., about 1 μm or 0.25 to 1.5 μm are especially advantageous in the present invention.

Inorganic pigment and/or filler particles based on talc, where about 95 to 98 wt %, e.g., 96 wt % of the talc particles have a spherical equivalent diameter of <10 μm, about 79 to 82 wt %, e.g., 80 wt % have a spherical equivalent diameter of <5 μm and about 43 to 46 wt %, e.g., 45 wt % have a spherical equivalent diameter of less than 2 μm are also advantageous.

The nano-calcium carbonate used for the coating may be synthetic precipitated calcium carbonate (PCC) which may have vateritic, calcitic or aragonitic crystal structure, for example.

The use of ground natural nano-calcium carbonate (ground calcium carbonate, GCC), e.g., in the form or marble, limestone and/or chalk containing at least 95 wt %, preferably more than 98 wt % calcium carbonate is especially preferred. Known pigments and/or fillers with a large fraction in the nanometer range are distributed by OMYA, for example.

In a special embodiment, about 90% to 100%, preferably 92% to 99%, more preferably 94% to 98%, especially preferably 96% to 98%, e.g., 97±0.5% of the calcium carbonate particles, based on the number N of the calcium carbonate particles, have a spherical equivalent diameter of less than 200 nm, preferably less than 150 nm, even more preferably less than 100 nm. The diameter is preferably in a range of 20 to 200 nm, 50 to 180 nm or 70 to 150 nm.

The particle size distribution was measured with the sedimentation method as described above using a Sedigraph 5100 apparatus from the company Micromeritics, USA and printed as a throughput summation curve using an X-Y plotter, where the X axis indicates the particle diameter as the corresponding spherical equivalent diameter and the Y axis indicates the corresponding particle content in weight percent (see for example P. Belger, Schweizerische Vereinigung der Lack- und Farben-Chemiker, XVII FATIPEC Congress, Lugano, Sep. 23-28, 1984).

The percentage of the particle count N % of nanoparticles was calculated from the measurement results thus obtained using the following method:

The values are taken from the Sedigraph curve. The difference between 0 and 0.2 µm yields the 0.1 µm value (100 nm), the difference between 0.2 and 0.4 µm yields the 0.3 µm value (300 nm), etc. The sum of differences is standardized to 100 mg and the quantities of each range are calculated from this. In the calculation, it is assumed that the particles are spherical and have a diameter d of the average of the difference range. This is used to calculate the volume V of a particle $$V=0.5236d^3$$

and then the weight W of a particle (divided by the specific density; for $CaCO_3$, this corresponds to 2.7 g/cm³)

$$W=V/2.7$$

By dividing the particle weight, the number of particles can be calculated from the weight of the respective fraction and then used to calculate the percentage distribution in N %.

If the calcium carbonate to be used does not yet have the desired or required fineness, i.e., particle size, it may be ground in one or more wet or dry grinding steps, preferably several grinding steps, e.g., two dry and/or wet steps, preferably aqueous grinding steps, to yield the corresponding spherical equivalent diameter.

The grinding may be performed in any of the known grinding equipment with which those skilled in the art are familiar for grinding calcium carbonate. Conventional ball mills are especially suitable for dry grinding; jet plate mills as well as attritor mills are suitable for wet grinding and combinations of such mills or combinations of one or more such mills with cyclones and screens are also very suitable. Especially conventional attritor mills such as those distributed by the company Dynomill are suitable for wet grinding.

In the case of dry grinding, preferably ball mills are used and preferably iron and/or porcelain beads with a diameter of 0.5 to 10 cm are used as grinding media, especially preferably iron-cylpebs with a diameter of 2.5 cm are used.

Grinding balls made of, e.g., zirconium silicate, zirconium dioxide and/or baddeleite with a diameter of 0.2 to 5 mm, preferably 0.2 to 2 mm, but also 0.5 to 5 mm, e.g., 0.5 to 2 mm are preferred for wet grinding. Quartz sand having an equivalent spherical diameter of 0.1 to 2 mm may also be used.

The calcium carbonate particles in the nanometer range, however, are preferably produced by wet grinding and/or are brought to the desired equivalent diameter, in particular when the material is natural calcium carbonate.

Both dry and wet grinding steps may be performed one after the other, but then the last grinding step is preferably a wet grinding.

The natural ground calcium carbonate may be dispersed and/or ground, e.g., in the form of an aqueous slurry in the presence of one or more grinding aids and/or dispersants, preferably at a solids content of more than 10 wt %, e.g., 15 to 30 wt %, preferably more than 30 wt %, more preferably more than 50 wt %, e.g., at a solids content of 65 to 68 wt %, especially preferably more than 70 wt %, e.g., at a solids content of 72 to 80 wt %.

Without grinding aids and/or dispersants, the calcium carbonate may preferably be dispersed and/or ground at a solids content of up to 30 wt %, e.g., 15 to 30 wt %. At a solids content of more than 30 wt %, it may be better to perform the dispersion and/or grinding in the presence of grinding aids and/or dispersants.

At concentrations of less than or equal to 30 wt %, wet grinding even without chemical additives is also possible. Such products, as well as calcium carbonate slurries having a low solids content of less than or equal to 60 wt %, for example, may preferably be concentrated by physical means, e.g., by filter pressing and/or centrifuging and/or thermally and using one or more dispersants. Combinations of mechanical and thermal concentration steps are especially preferred. The final concentration after the concentration steps is preferably greater than 60 wt % solids content, especially preferably between 65 wt % and 78 wt %, e.g., 72±2 wt %.

For example, anionic grinding aids and/or dispersants may be used as the grinding aids and/or dispersant, preferably selected from the group comprising homo- or copolymers of polycarboxylic acid salts based on, e.g., acrylic acid, methacrylic acid, maleic acid, fumaric acid or itaconic acid or mixtures thereof. Homopolymers or copolymers of acrylic acid such as those available from BASF, Ludwigshafen, Allied Colloids, Great Britain or COATEX, France are especially preferred. The molecular weight Mw of such products is preferably in the range of 200 to 15000; a Mw of 3000 to 7000 is especially preferred. The molecular weight Mw of such products, however, is also preferably in the range of 2000 to 150000 g/mol; a Mw of 15000 to 50000 g/mol, e.g., 35000 to 45000 g/mol is especially preferred. The molecular weight of the grinding aids and/or dispersants is selected so that they act as parting agents rather than as binders. The polymers and/or copolymers may be neutralized with monovalent and/or polyvalent cations or they may have free acid groups. Suitable monovalent cations include for example sodium, lithium, potassium and/or ammonium. Suitable polyvalent cations include for example divalent cations such as calcium, magnesium, strontium or trivalent cations such as aluminium. Sodium and magnesium are especially preferred. Grinding aids and/or dispersants such as sodium polyphosphates or sodium citrate may also be used to advantage either alone or in combination with others.

Especially in dry grinding, the grinding agents and/or dispersants used may also be selected from the group comprising glycols, polyglycols, e.g., polyethylene glycols, ethylene oxide-propylene oxide-ethylene oxide block copolymers or alkanolamines, e.g., triethanolamine and triisopropanolamine or a mixture thereof.

The dispersants and/or grinding aids may be used in an amount of about 0.01 wt % to 5 wt %, based on the total dry weight of the composite, e.g., in dry grinding in an amount of about 0.01 to 0.5 wt %, preferably 0.1 to 0.3 wt %. They are especially preferably used in an amount of 0.2 to 1 mg/m² nanoparticle surface area, e.g., in an amount of 0.3 to 0.7 mg/m² nanoparticle surface area.

In wet grinding, the dispersants and/or grinding aids are advantageously present in an amount of about 0.05 to 2.0 wt %, preferably in an amount of 0.3 to 1.5 wt %, e.g., 1 wt %, but also in an amount of about 0.85 to 0.95 wt %.

The grinding aids and/or dispersants support the grinding of the calcium carbonate particles down to the nano range by reducing the viscosity of the slurry and thereby increasing the mobility and free path length of the particles to be ground and the grinding beads. This is also especially advantageous in subsequent formation of the composite.

The viscosity of the slurry in wet grinding is preferably less than 2500 mPa·s, more preferably less than 1500 mPa·s, in particular less than 1000 mPa·s, or better yet, less than 500 mPa·s and especially preferably in the range from 50 to 250 mPa·s, measured on a conventional Brookfield viscometer, e.g., EV-2+ type with a disk spindle of 3 and 100 rpm.

It is also possible during grinding and/or dispersing to use other monomeric or polymeric additives in addition to the grinding aids and/or dispersants, e.g., ethylene-acrylic acid copolymers (EAA) or salts thereof alone or in combination. The ratio of acrylic acid monomers in the copolymer with ethylene monomers is preferably 1:4 to 1:50, especially preferably 1:4 to 1:10 and especially 1:5. The preferred EAAs and/or their salts are those which in the neutralised form have a melt viscosity of 3000 to 25000 mPa·s, 15000 to 100000 mPa·s and 50000 to 400000 mPa·s at 200, 170 and 140° C., respectively, preferably 3000 to 7000 mPa·s, 15000 to 20000 mPa·s and 50000 to 100000 mPa·s at 200, 170 and 140° C., respectively, and in particular have a melt viscosity of 15000 to 25000 mPa·s, 50000 to 100000 mPa·s and 300000 to 400000 mPa·s at 200, 170 and 140° C., respectively.

An EAA copolymer having a melt viscosity of 24300 mPa·s at 200° C., 88300 mPa·s at 170° C. and 367000 mPa·s at 140° C. is especially preferred.

Commercially available EAAs that are very suitable and preferably have an acrylic acid content of 20 mol % are distributed by BASF, Germany, and Dow, USA, for example.

The use of EAA copolymers or their salts results in a partial to complete hydrophobisation of the pores of the substrate, e.g., the coated paper and/or the pores of the composite itself so that wetting of the open pores of the paper and/or the coating and/or the composite by water is reduced, controlled and/or prevented.

If the EAA salts are used, they are partially or completely neutralized, e.g., with amines, preferably selected from the group comprising 2-amino-2-methyl-1 propanol, 3-amino-1-propanol, 2-[bis(2-hydroxyethyl)amino]ethanol and/or alkali metal ions such as potassium, lithium and/or sodium or mixtures thereof, preferably sodium. For example, at least 70 mol % or at least 95 mol % of the carboxylic acid groups are neutralized.

EAAs and their salts may be used in an amount of 0.01 wt % to 10 wt %, based on the total dry weight of the composite, preferably 0.01 wt % to 5 wt %, more preferably 0.05 to 5 wt %, 0.1 wt % to 2 wt %, e.g., in an amount of 1.0 wt %.

The inventive composite preferably contains, based on the total dry weight of the composite, 5 to 95 wt %, more preferably 20 to 80 wt %, even more preferably 25 to 75 wt % pigment particles and/or filler particles. The inventive composite preferably contains 95 to 5 wt %, preferably 80 to 20 wt %, more preferably 75 to 25 wt % calcium carbonate particles, based on the total dry weight of the composite.

The pigment particles and/or filler particles and the nano-calcium carbonate are preferably used in a ratio of 1:20 to 20:1, especially in a ratio of 1:4 to 4:1, more preferably in a ratio of 1:3 to 3:1 or 1:2 to 2:1 or also in a ratio of 1:1, based on the dry weight. The weight ratio of inorganic and/or organic pigment and/or filler particles to nano-calcium carbonate is most especially preferably 3:1 or 1:3.

The binder used in the inventive composite consists of a copolymer, comprising as monomers one or more dicarboxylic acids and one or more monomers from the group of diamines, triamines, dialkanolamines or trialkanolamines.

It facilitates adhesion of the nanoparticles to the surface of the microparticles.

Preferably saturated or unsaturated branched or unbranched $C_2$-$C_{10}$ dicarboxylic acids, preferably $C_3$-$C_9$ dicarboxylic acids, $C_4$-$C_8$ dicarboxylic acids, $C_5$-$C_7$ dicarboxylic acids, especially adipic acid are used as the dicarboxylic acid monomers.

Linear and branched chain substituted and unsubstituted diamines and triamines are especially suitable as the second monomer of the binder polymer, especially N-(2-aminoethyl)-1,2-ethanediamine. Dialkanolamines and trialkanolamines that are preferred for use include for example diethanolamine, N-alkyldialkanolamines, such as N-methyl- and N-ethyldiethanolamine and triethanolamine.

To control and regulate the molecular weight, i.e., the chain length, one or more monovalent amines such as monoalkanolamines may be used during polycondensation. Monoethanolamine is preferably used.

In a preferred embodiment within the scope of the present invention, a copolymer that is also crosslinked with epichlorohydrin is used as the binder.

In an especially preferred embodiment of the present invention, a copolymer of adipic acid with N-(2-aminoethyl)-1,2-ethanediamine and epichlorohydrin is used as the binder.

The binder may also contain other aids for copolymerization or other conventional aids and additives, e.g., isocyanates.

Based on the total dry weight of the composite, the binder is advantageously present in an amount of about 0.1 to about 10 wt %, preferably about 0.3 to about 5 wt %, especially preferably about 0.5 to about 3 wt %.

Another aspect of this invention is a method for manufacturing the inventive composite, wherein the pigment microparticles and/or filler microparticles, the nano-calcium carbonate composition, and the binder are provided and mixed. The binder here is either added to the pigment and/or filler particles or to the calcium carbonate composition and the resulting mixture is combined with the respective second component and homogenized.

In an alternative aspect, pigment particles and/or filler particles are first mixed with the calcium carbonate composition and the resulting reaction mixture is combined with the binder and homogenized.

However, an aqueous solution or slurry of the binder may also be provided first with the pigment microparticles and/or filler microparticles being added first to the aqueous solution or slurry and then the nano-calcium carbonate composition being added, or with the nano-calcium carbonate composition being added first and the then the pigment microparticles and/or filler microparticles being added and then homogenized.

In principle, both the pigment microparticles and/or filler microparticles as well as the nano-calcium carbonate composition may be used either dry or as an aqueous slurry. If the pigment and/or filler microparticles and the nano-calcium carbonate composition are used dry, however, enough water must be used first to yield an aqueous slurry.

The nano-calcium carbonate composition is usually provided in the form of an aqueous slurry, while the pigment microparticles and/or filler microparticles may be used in solid form or in the form of an aqueous slurry. The inorganic pigment and/or filler microparticles are often preferably used in solid form and the organic pigment and/or filler microparticles are often preferably used as an aqueous slurry.

The term "solid" as used here is not necessarily to be understood as meaning "dry." The term "solid" should be used to describe only the consistency of the substance used, which may have a considerable moisture content. For example, a mixture of 80 wt % inorganic pigment microparticles and/or filler microparticles with 20 wt % water may nevertheless have a solid consistency.

The binder is preferably provided in the form of an aqueous slurry, especially preferably as a solution.

To ensure better dispersion, one or more dispersants may also be added to each of the slurries or mixtures, e.g., in the form of a powder or an aqueous solution. The dispersant(s) may be added, for example, after addition of the binder to the resulting reaction mixture or before addition of the binder to the pigment and/or filler particles or before the addition of the calcium carbonate composition to the component to which the binder is subsequently added or the component that is mixed in.

Advantageous dispersants include, for example, polyacrylic acid salts such as the sodium salt, sodium polyphosphate or polyacrolein/acrylate copolymers.

In addition, however, cationic and/or amphoteric polymeric dispersants may also be added, e.g., polydiallyldimethylammonium chloride (PolyDADMAC) or copolymers of acrylic acid with cationic monomers or mixtures of such dispersants. Such products are described, for example, in DE 40 18 162 and are available from the company Stockhausen GmbH, Krefeld under the name Prästol, for example.

These dispersants may additionally be added to the binder in an amount of 0.01 wt % to 1 wt %, based on the total dry weight of the composite, preferably in an amount of 0.1 wt % to 0.5 wt %, e.g., 0.25 wt %. They support the adsorption of the binder.

Mixing and homogenizing the slurry of the pigment and/or filler particles and/or the calcium carbonate composition including the admixture and stirring of the binder may be performed with a Pendraulik-type stirrer, for example, with a toothed disk with a diameter of 3.5 cm as the stirrer, preferably at room temperature.

It is likewise possible to mix and homogenize the slurries in particular when the pigment and/or filler particles are first combined with the binder by using a ploughshare mixer. Ploughshare mixers function according to the principle of the mechanically produced fluidized bed. Ploughshare blades rotate close to the inside wall of a horizontal cylindrical drum and convey the components of the mixture out of the product bed into the open mixing space. The mechanically produced fluidized bed ensures an intense mixing effect even with large batches in a very short period of time. Choppers and/or dispersers are used to disperse lumps when operating dry. The equipment used is available from the company Gebrüder Lödige Maschinenbau GmbH, Paderborn, Germany.

If the slurry of the calcium carbonate composition is not added until the pigment and/or filler particles have already been pretreated with the binder, this may be accomplished, for example, by means of a tubular mixing apparatus, e.g., by pumping the slurry with the help of a centrifugal pump through the tubular mixing apparatus and continuously introducing the slurry of pretreated pigment and/or filler particles into the tubular mixing apparatus through an intake tube. Such a tubular mixing apparatus is available, for example from Ystral GmbH, Ballrechten-Dottingen, Germany.

Mixing is performed at a room temperature of about 20° C. to 25° C. Heating during the production process, e.g., due to friction during the dispersion process need not be counteracted. For example, the temperature during the process may usually be 20° C. 20 to 90° C., preferably between 20° C. and 70° C.

A combination of various mixing systems may also be used.

The composites obtained by the inventive production process may be dried so that the composite is obtained as solids, but they may also be processed further as a slurry and as a renewed aqueous slurry of the dried composite so that not only the inventive composite per se but also an aqueous slurry thereof constitutes an aspect of the present invention.

The water content of the composite slurries obtained by the inventive production process can be reduced, e.g., thermally, e.g., with a spray dryer or a microwave or in an oven or mechanically, e.g., by filtration so that the composite is obtained as a dry or moist solid, e.g., in the form of a filter cake. To obtain a dried composite, it is dried for example in an oven at 105° C. until reaching a constant weight.

Additional aspects of the present invention constitute the use possibilities of the composite whether in a solid, moist or dry state or as an aqueous slurry.

Thus one of the main uses of the composite or a slurry thereof is its use as a filler or pigment, e.g., in paper and/or as a coating pigment, but not in the production or processing of thermal paper, if the composite contains organic microparticles.

The composite may be used as a filler or pigment in papermaking or in paper finishing, e.g., in coating paper, but not thermal paper if the composite contains organic microparticles.

In papermaking, the composite is preferably used in amounts of 0.5 to 50 wt %, preferably 1 to 30 wt %, based on the total weight of the paper. In paper finishing, e.g., in coating paper, preferably amounts of the inventive composite of 0.5 to 100 g/m$^2$ are used, preferably 2 to 50 g/m$^2$, especially preferably 5 to 25 g/m$^2$ per side of paper.

The composite may also be used in multiply coated systems, e.g., in the pre-coating and/or intermediate coating and/or top coating and/or single coating. If the composite is a pre-coating and/or intermediate coating, another application of coating may be applied thereto using conventional pigments with which those skilled in the art are familiar. The composite may be used for paper coated on one or both sides, in which case one or more of the coats on one or both sides will contain the composite.

The paper which is coated on one or both sides or is uncoated may be calendered paper as well as uncalendered paper.

Through a targeted choice of the composite with regard to its composition and size, the pore volume of the paper and/or the coating may also be varied by coverage or noncoverage by the composite particles, e.g., enlarged and controlled, in which case such a use of the inventive composites, if they contain organic microparticles, does not extend to the field of thermal papers, their production or processing.

The inventive composite may also be used together with other conventional pigments and/or fillers if its use does not pertain to the field of thermal paper, their production or processing if the composite contains organic microparticles.

The subject of the present invention thus also includes fillers or pigments comprising an inventive composite or a slurry thereof.

Another aspect of the present invention is the use in production of paints or plastics, e.g., to increase the opacity of paints or plastics. The composites here comprising hollow spherical organic microparticles may in particular also induce an increase in the thermal insulation effect.

Likewise, the inventive composites may also be used to reduce the sheen because of their structure. The term "sheen" is understood to refer to a gloss formed when a surface is observed at a very shallow angle; this often has a very irritating effect on the observer. To reduce sheen, a very diverse scattering is required, which can be provided by the inventive composites.

The inventive composites may also be used in sealing substances, e.g., as thickeners or viscosity control agents.

Due to the platelet-like structure of the inorganic micropigments and/or microfillers such as talc and/or mica and the surface properties of calcium carbonate, the inventive composite allows the use of a "platelet-like calcium carbonate" for example.

Due to the hollow spherical structure of the organic micropigments and/or fillers such as polystyrene hollow beads and the surface properties of calcium carbonate, the inventive composite also allows the use of a "light calcium carbonate" in plastics and paints, for example, which may be advantageous in aeronautical engineering, for example.

Another aspect of the present invention relates to the use of the inventive composite or a slurry thereof as a filtration aid, either alone as a filter layer or in or on a natural and/or synthetic carrier material such as cotton fibres, cellulose fibres and polyamide fibres. Due to the porous structure and low segregation of the composites, this yields an optimal liquid transfer with a good retention power of suspended particulate matter at the same time.

The present invention thus also relates to a filtration aid comprising an inventive composite or a slurry thereof.

Another aspect of the present invention relates to a coating colour comprising an inventive composite but not for use in production or processing of thermal paper if the composite contains organic microparticles.

Such a coating colour preferably has a solids content of 25 to 75 wt % solids, more preferably 30 to 60 wt % solids, especially preferably 30 to 40 wt % solids. The amount of composite based on the total solids content of the coating colour may be 3 to 97 wt %, preferably between 10 and 90 wt %. It is especially preferably 85±10 wt %.

In view of the excellent binding properties of the inventive binders in the inventive composites, especially with regard to the surprisingly good binding of the nanoparticles of the calcium carbonate on the microparticle surface, finally another aspect of the present invention involves the use of a copolymer comprising as monomers one or more dicarboxylic acids and one or more monomers from the group of diamines, triamines, dialkanolamines or trialkanolamines for at least partial coating of pigment and/or filler particles with a composition comprising nano-calcium carbonate such as those described above. Use of a copolymer of adipic acid with N-(2-aminoethyl)-1,2-ethanediamine and epichlorohydrin as the binder is especially preferred.

The figures described below and the examples and experiments serve to illustrate the present invention and should not restrict it in any way.

DESCRIPTION OF THE FIGURES

The figures described below are scanning electron micrographs (SEM) of the various mixtures of the state of the art and inventive composites. The mixtures and the inventive composites were adjusted to a concentration of 20 wt % in water using an ultraturrax. A few drops (approximately 100 mg) were diluted in 250 mL distilled water and filtered through 0.2 μm pore membrane filter. Preparations obtained on the membrane filter in this way were sputtered with gold and evaluated in the SEM at various enlargements.

EXAMPLES

Figure 1:
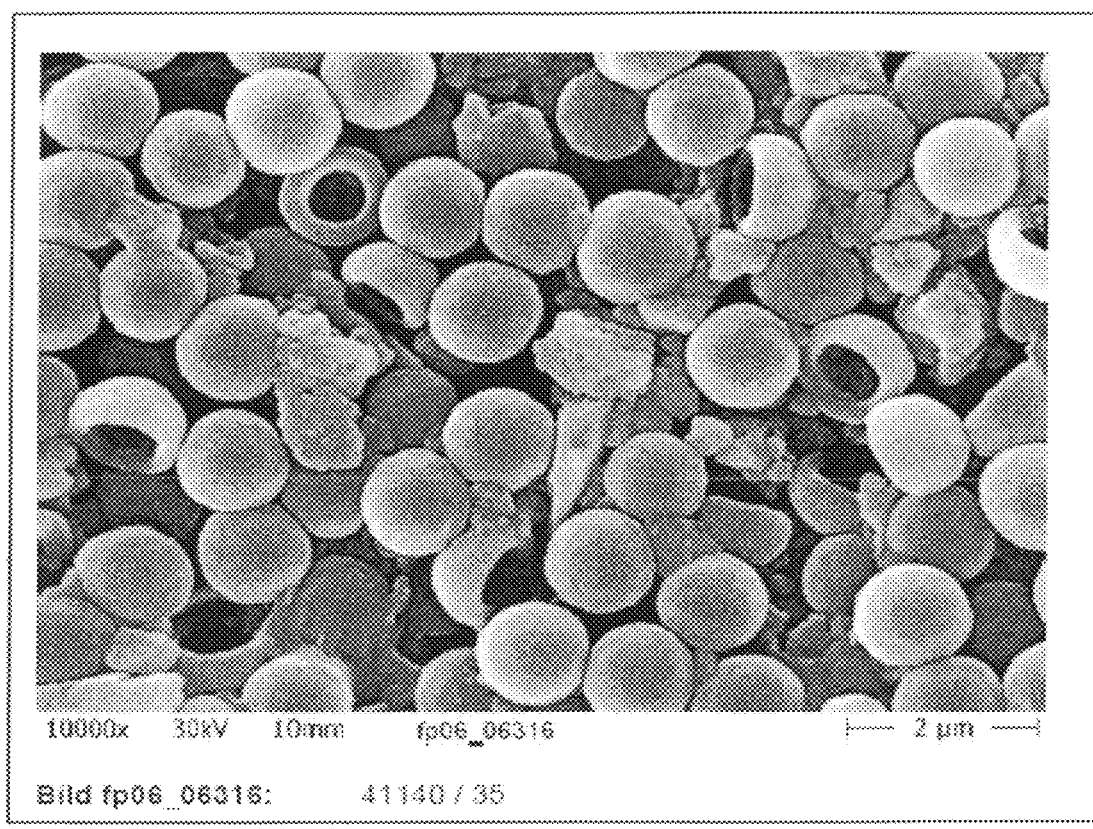
FIG. 1 shows an SEM of a preparation of a mixture of nano-calcium carbonate and organic microparticles without a binder.

Production and Description of Nanoparticles that can be Used According to the Present Invention The production of nano-calcium carbonate compositions suitable for the inventive composites is described below.

Nano-calcium carbonate composition 1 was ground continuously using Norwegian marble preground in a conventional ball mill in a dry process to yield a spherical equivalent diameter of 45 μm by wet grinding in a vertical 160 liter attritor ball mill in two passes using a total of 0.85 wt % sodium/magnesium polyacrylate with a Mw of about 6000 g/mol, based on the total dry weight of the composite as dispersant/grinding aid, at a solids content of 72 wt % to yield the following size distribution:

| Diameter (nm) | Number (N) of particles in N % | Wt % |
| --- | --- | --- |
| <200 | 97.4 | 23.6 |
| 200-400 | 2.0 | 22.4 |
| 400-600 | 0.4 | 18.7 |
| 600-800 | 0.1 | 14 |
| 800-1000 | >0.1 | 9.3 |

The Brookfield viscosity of the slurry obtained after wet grinding was 285 mPa·s.

The grinding beads that were used, made of zirconium silicate and baddeleite were 0.5 to 2 mm in size.

Nano-calcium carbonate composition 2 was ground continuously using Norwegian marble preground dry in a conventional ball mill to a spherical equivalent diameter of 45 μm by wet grinding in a vertical 160 liter attritor ball mill in two passes using a total of 0.85 wt % sodium/magnesium polyacrylate with a Mw of about 6000 g/mol, based on the total dry weight of the composite as dispersant/grinding aid, and 1 wt % polyethylene-polyacrylic acid copolymer sodium salt (from Primacor 5880 I, DOW, neutralized at 95° C. with an equivalent amount of NaOH, based on the carboxylic acid groups) based on the total dry weight of the composite, at a solids content of 72 wt % to yield the following size distribution:

| Diameter (nm) | Number (N) of particles in N % | Wt % |
|---|---|---|
| <200 | 96.5 | 26.1 |
| 200-400 | 2.7 | 20 |
| 400-600 | 0.5 | 17.8 |
| 600-800 | 0.1 | 13.3 |
| 800-1000 | <0.1 | 8.9 |

The Brookfield viscosity of the slurry obtained after production was 450 mPa·s.

The grinding beads that were used, made of zirconium silicate and baddeleite were 0.5 to 2 mm in size.

Nano-calcium carbonate composition 3 was ground continuously using Norwegian marble with a spherical equivalent diameter of 45 μm by wet grinding in a vertical 1500-liter attritor ball mill in two passes using a total of 0.95 wt % sodium/magnesium polyacrylate with a Mw of about 6000 g/mol, based on the total dry weight of the composite as dispersant/grinding aid, at a solids content of 75 wt % to yield the following size distribution:

| Diameter (nm) | Number (N) of particles in N % | Wt % |
|---|---|---|
| <200 | 97.4 | 34.3 |
| 200-400 | 2.0 | 19.2 |
| 400-600 | 0.4 | 17.9 |
| 600-800 | 0.1 | 11.7 |
| 800-1000 | >0.1 | 6.5 |

The Brookfield viscosity of the slurry obtained after production was 285 mPa·s.

The grinding beads that were used, made of zirconium silicate and baddeleite were 0.5 to 2 mm in size.

Nano-calcium carbonate composition 4 was produced continuously by using Southern French limestone from Provence having a spherical equivalent diameter of 45 μm by wet grinding in a horizontal stirred mill (Dynomill 1.4 liter content) using a total 0.45 wt % sodium/magnesium polyacrylate with a Mw of about 6000 g/mol, based on the total dry weight of the limestone as dispersant/grinding aid, with a solids content of 65 wt % to yield the following size distribution:

| Diameter (nm) | Number (N) of particles in N % | Wt % |
|---|---|---|
| <200 | 97.1 | 17.4 |
| 200-400 | 2.2 | 10.5 |
| 400-600 | 0.5 | 10.9 |
| 600-800 | 0.2 | 9.4 |
| 800-1000 | 0.1 | 8.5 |

The Brookfield viscosity of the slurry obtained after production was 285 mPa·s.

The grinding beads that were used, made of zirconium silicate and baddeleite were 0.5 to 2 mm in size.

Then the slurry was dried using a spray drier (supplier: NIRO Co.) at a starting temperature of 105° C. The moisture content after drying was <0.3 wt % water.

Description of Microparticles that can be Used According to the Invention

Organic Microparticles 1: Ropaque HP-1055 Slurry (Rohm & Haas):
    Particle size: relatively uniform 1.0 μm
    The particle size was determined by SEM.
    Solids content: 27 wt % (determined at 120° C., 2 hours in an oven)

Organic Microparticles 2: Polyethylene Dispersion
    Particle size: about 0.25-1.5 μm
    The particle size was estimated visually by SEM.
    Solids content: 25.1 wt % (determined at 120° C., 2 hours in an oven)

Inorganic Microparticles 1: Finntalc C 10 Slurry (MONDO Minerals, Finland):

| Particle size: | 95 wt % <10 μm |
|---|---|
| | 80 wt % <5 μm |
| | 45 wt % <2 μm |

The particle size was determined by the sedimentation method using a
Sedigraph 5100, Micromeritics, USA.
Solids content: 61.5 wt % (determined at 120° C., 2 hours in an oven)

Inorganic Microparticles 2: Finntalc P 05 Powder, MONDO Minerals, Finland

| Particle size: | 96 wt % <10 μm |
|---|---|
| | 79 wt % <5 μm |
| | 43 wt % <2 μm |

The particle size was determined by the sedimentation method using a Sedigraph 5100, Micromeritics, USA.
Moisture content: <0.5 wt % water (determined at 120° C., 2 hours in an oven)

Description of Binders that can be Used According to the Present Invention

Binder 1
    15±0.5 wt % aqueous solution of a copolymer of adipic acid with N-(2-aminoethyl)-1,2-ethanediamine and epichlorohydrin having the following characteristics:
    Total chlorine content: about 1.5 wt %
    Organic chlorine content: <0.5 wt %
    Mw>1000 g/mol
    Brookfield viscosity of the aqueous solution: 80 mPa·s±30 mPa·s (Brookfield type EV-2+, disk spindle 3, 100 rpm)
    pH 3.0
    Such products can be produced by two-step synthesis in the manner familiar to those skilled in the art for organic synthesis. Production takes place, for example, by producing an intermediate product consisting of the reaction product of diethylenetriamine, mono-ethanolamine and adipic acid in distilled water. In a second reaction, the resulting intermediate is reacted with epichlorohydrin using sulphuric acid and potassium sorbate as the catalyst to yield the end product, diluted with water to a solids content of 12 to 20 wt % and the pH is adjusted to pH 3 with more sulphuric acid. Such copolymers are sold by the company Lanxess, Germany and the company Mare in Italy, e.g., as Nadavin, e.g., Nadavin DHN (15%).

Binder 2
- 60±0.5 wt % active aqueous solution of a copolymer of adipic acid with N-(2-aminoethyl)-1,2-ethanediamine with the following characteristics:
  - Brookfield viscosity of the 60 wt % aqueous solution: 1300 mPa·s±100 mPa·s (Brookfield type EV-2+, disk spindle 3, 100 rpm)
  - Acid number: 12 mg KOH/g solids
  - Colour number according to Gardner: 4
  - pH 8.9
- Such products can be produced by a one-step synthesis process in the manner with which those skilled in the art are familiar for organic synthesis. Production for this invention takes place by reacting 300.0 g diethanoltriamine, 18.7 g monoethanolamine and 446.9 g adipic acid in 439.4 g distilled water. The monoethanolamine is added slowly in portions to the diethanoltriamine. During this addition, the temperature is kept at 110° C. to 120° C. If the exothermic reaction is concluded, the reaction mixture is heated slowly to 160° C. to 170° C., taking into account the steam temperature of max. 103° C. At this temperature the mixture is cooked to an acid number of about 20 mg KOH/g. Then it is cooled to 130° C. and distilled water is added cautiously in small portions until the solids content is 60 wt %.

EXAMPLES

Example 1

Comparative Experiment 1

Mixture of Organic Particles 1 and Nano-Calcium Carbonate Composition 3

473.3 g of nano-calcium carbonate composition 3 was mixed with 438.2 g of the slurry of organic microparticles 1 in a Pendraulik agitator with a toothed disk with a diameter of 3.5 cm as the stirrer and a stirrer speed of 7500 rpm at a starting temperature of 22° C. for 15 minutes while stirring. The final temperature after mixing was 45° C.

The resulting mixture had the following characteristics:
Brookfield viscosity measured after 5 min/60 min/120 min: 77/79/81 mPa·s
pH 8.23
Solids content: 52.22 wt %

FIG. 1 shows clearly that the nano-calcium carbonate is segregated from the organic microparticles. Only a small portion of the 75 wt % nano-calcium carbonate can be seen in the SEM.

A filter test was performed to illustrate the segregation tendency by preparing 200 mL of a slurry with 0.5 wt % solids content of the nanoparticle/microparticle mixture and filtering the slurry using a membrane filter with a pore diameter of 0.2 μm (pressure: about 25 mbar, water suction pump; room temperature). The time to filter 200 mL was measured. When segregation occurs, nano-calcium carbonate passes through the pores first but over a period of time a secondary filter cake forms on the membrane filter and blocks the pores.
Filtering time: >24 hours. After 10 hours, there was still 90 mL of slurry to be filtered.

The filtering time shows clearly the segregation of nanoparticles and microparticles.

Comparative Experiment 2

Mixture of Organic Microparticles 2 and Nano-Calcium Carbonate Composition 3

900 g, based on the dry matter of nano-calcium carbonate composition 3 was mixed while stirring with 100 g, based on the dry matter of the slurry of organic microparticles 2 in the Pendraulik stirrer with a toothed disk having a diameter of 3.5 cm as the stirrer at a stirrer speed of 7500 rpm, at a starting temperature of 22° C. for 15 minutes. The final temperature after mixing was 40° C.

The resulting mixture had a solids content of 62.5 wt %.

Figure 2:
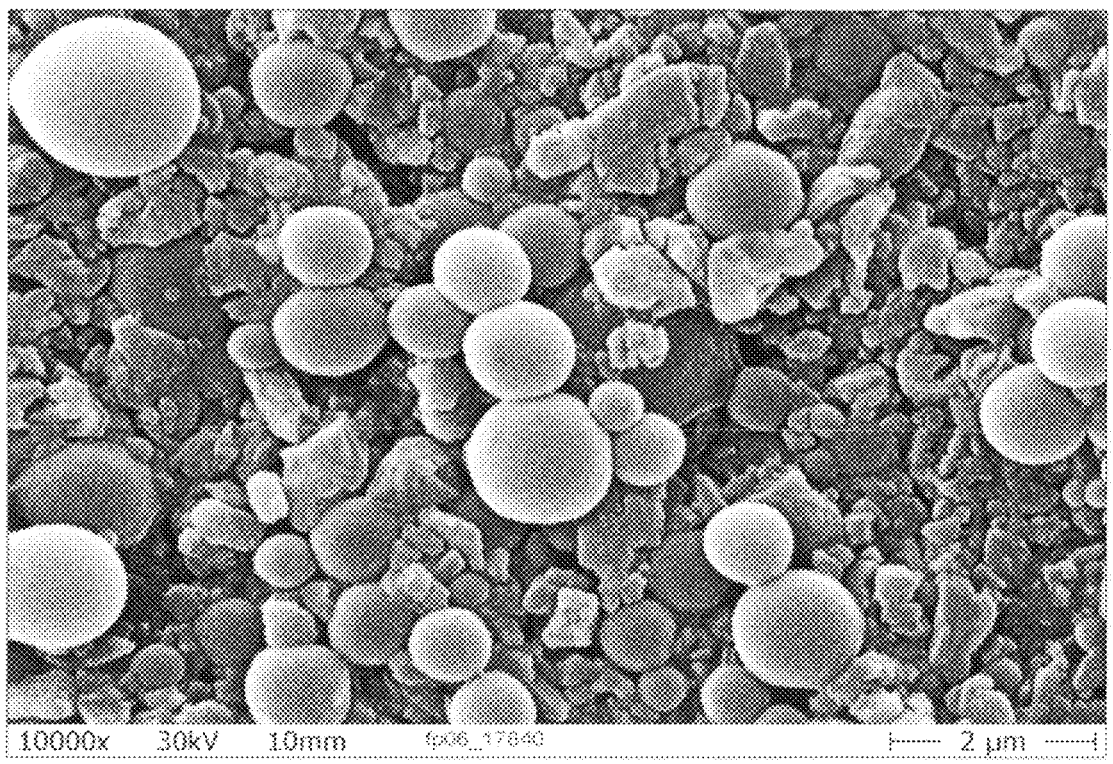
FIG. 2 shows the SEM of another preparation of a mixture of nano-calcium carbonate and organic microparticles without a binder.

FIG. 2 shows clearly that the nano-calcium carbonate is segregated from the organic microparticles. Only a small portion of the 90 wt % nano-calcium carbonate can be seen in the SEM.

Comparative Experiment 3

Mixture of Inorganic Microparticles 2 and Calcium Carbonate Ground Jointly

A mixture of
- 47.0 wt % Norwegian marble ground dry in a conventional ball mill to an average spherical particle diameter of 45 μm
- 23.3 wt % microparticle 2
- 28.9 wt % water
- 0.4 wt % sodium polyacrylate solution as a grinding aid
- 0.4 wt % potassium-neutralized (acrylic acid/butyl acrylate) copolymer solution as dispersant was ground to the following grain size distribution by wet grinding in a horizontal stirred ball mill from the company Dynomill having a capacity of 2 liters:

| Particle size: | 99 wt % <10 μm |
| --- | --- |
|  | 76 wt % <2 μm |
|  | 51 wt % <1 μm |
|  | 12 wt % <0.2 μm |

The particle size was determined by the sedimentation method using a Sedigraph 5100 from Micromeritics, USA.
Brookfield viscosity measured after 5 min/60 min/120 min: 182/194/210 mPa·s
pH 9.4
Solids content: 69.8 wt %

Figure 3:
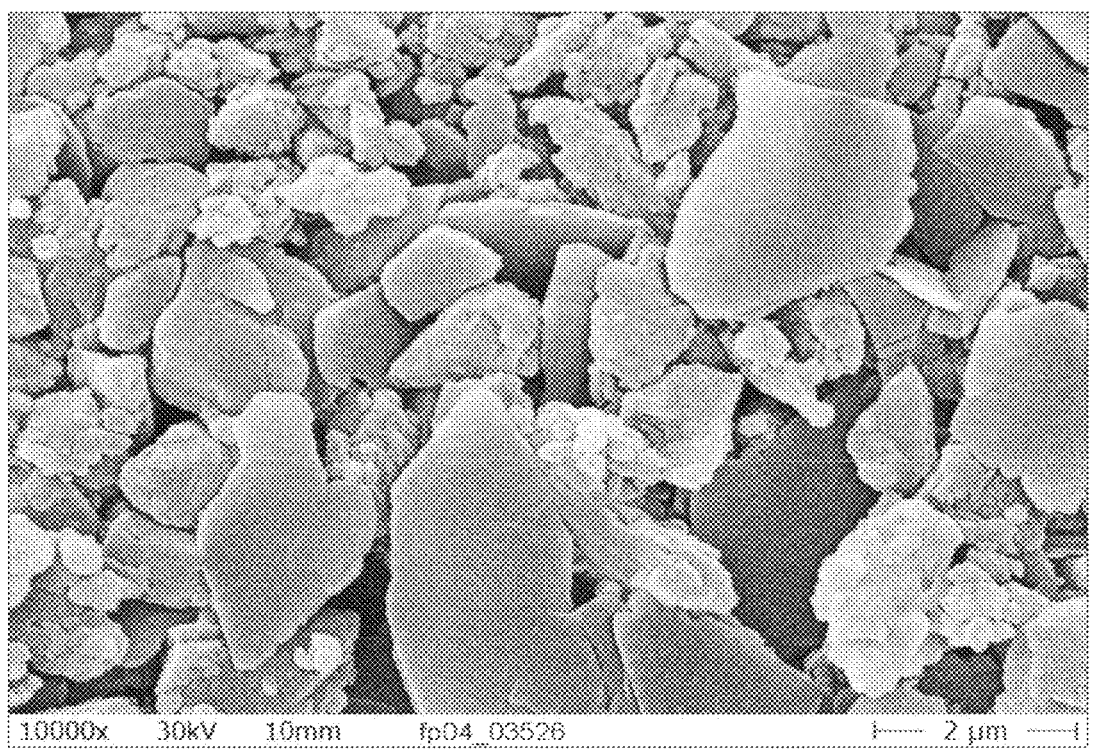
FIG. 3 shows the SEM of a preparation of a mixture of nano-calcium carbonate and inorganic microparticles without a binder.

FIG. 3 shows clearly that the nano-calcium carbonate is segregated from the inorganic microparticles.

A filter test was performed to illustrate the segregation tendency by preparing 200 mL of a slurry with 0.5 wt % solids content of the jointly ground mixture and filtering the slurry through a membrane filter with a pore diameter of 0.2 μm (pressure: about 25 mbar, water suction pump; room temperature). The time required to filter 200 mL was measured. When segregation occurs, nano-calcium carbonate first pass through the pores but over a period of time a secondary filter cake forms on the membrane filter and blocks the pores.
Filtering time: >24 hours. After 12 hours, there was still 50 mL of slurry to be filtered.

The filtering time shows clearly the segregation of nanoparticles and microparticles.

Comparative Experiment 4

Mixture of Inorganic Microparticles and Nano-Calcium Carbonate Composition 1

753.4 g of nano-calcium carbonate composition 1 was mixed with 882.0 g of the slurry of inorganic microparticles 1 while stirring in the Pendraulik stirrer with a toothed disk having a diameter of 3.5 cm as the stirrer at a stirring speed of 7500 rpm, at a starting temperature of 22° C. for 15 minutes. The final temperature after mixing was 48° C.

The resulting mixture had the following characteristics:
Brookfield viscosity measured after 5 min/60 min/120 min: 142/138/138 mPa·s
pH 8.28
Solids content: 66.5 wt %

Figure 4:
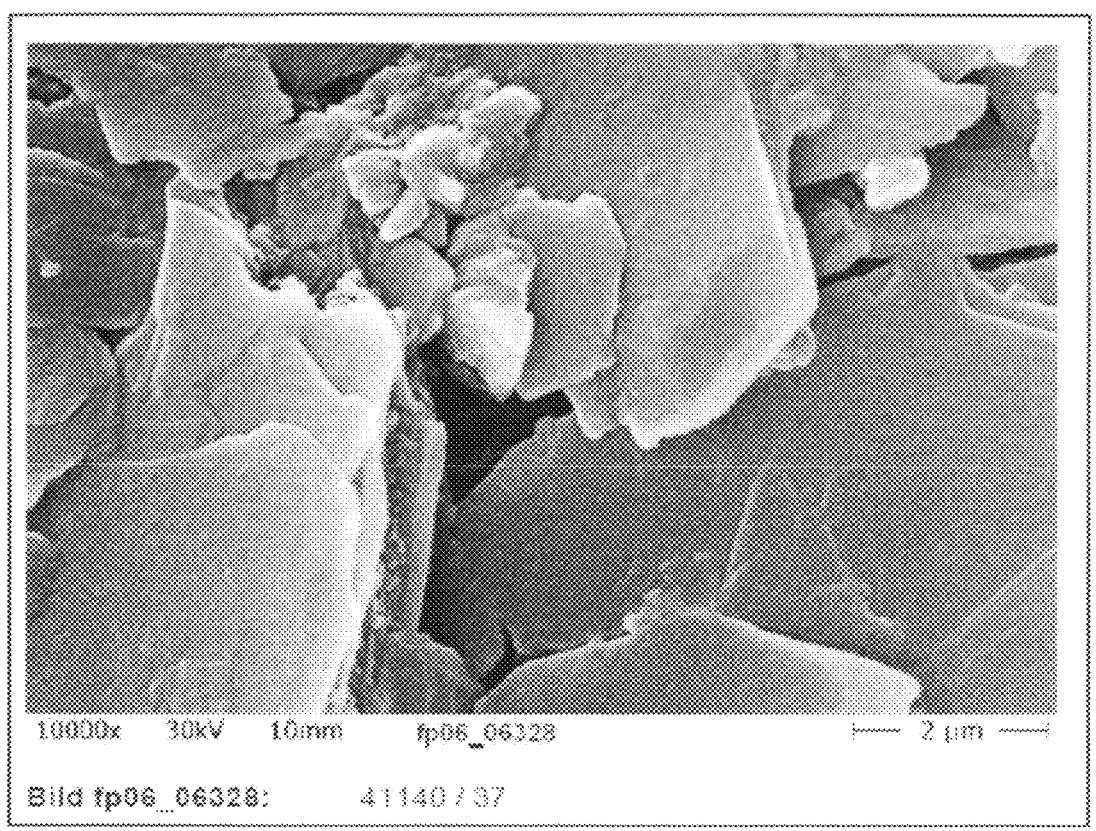
FIG. 4 shows the SEM of a preparation of a mixture of nano-calcium carbonate and inorganic microparticles without a binder.

It can be seen clearly in FIG. 4 that the nano-calcium carbonate is segregated from the inorganic microparticles. Only a small portion of the 50 wt % nano-calcium carbonate can be seen in the SEM.

A filter test was performed to illustrate the segregation tendency by preparing 200 mL of a slurry with 0.5 wt % solids content of the nanoparticle/microparticle mixture and filtering the slurry using a membrane filter with a pore diameter of 0.2 μm (pressure: about 25 mbar, water suction pump; room temperature). The time required to filter 200 mL was measured. When segregation occurs, nano-calcium carbonate first passes through the pores but over time a secondary filter cake forms on the membrane filter and blocks the pores.
Filtering time: >24 hours. After 10 hours there was still 70 mL of slurry to be filtered.

The filtering time clearly shows the segregation of nanoparticles and microparticles.

Inventive Examples

Example 2

Composites of Organic Microparticles, Nano-Calcium Carbonate Compositions and Binder 1

Experiment 5

Composite of 25 Wt % Organic Microparticles 1 and 75 Wt % Nano-Calcium Carbonate Composition 3

2100 g of the nano-calcium carbonate composition 3 was placed in the Pendraulik and 1944.4 g of the slurry of organic microparticles 1 was stirred into the composition during 2 minutes. The solids content was diluted with water to a concentration of 50 wt %; 272.7 g binder 1 as an aqueous solution with a solids content of 15.4 wt % was stirred into this mixture during another 2 minutes and diluted with water to a solids content of 35 wt %. The resulting reaction mixture was sheared for 15 minutes, whereby after half of the shearing time, the pH was adjusted to 9 with 10 wt % NaOH and dispersed with 0.525 wt %, based on the total solids content of a 42 wt % active aqueous solution of a sodium salt of polyacrylic acid (Mw: about 4000 g/mol; pH 8.5). The Pendraulik stirrer was equipped with a toothed disk having a diameter of 3.5 cm and the stirring speed was 7500 rpm. The starting temperature was 21° C. and the final temperature after the 15-minute shearing time was 38° C.

The resulting composite slurry had the following characteristics:
Brookfield viscosity measured after 5 min/60 min/120 min: 610/580/583 mPa·s
pH 9.04
Solids content: 35.1 wt %

Figure 5:
FIG. 5 shows the SEM of a preparation of an inventive composite of organic microparticles, nano-calcium carbonate and a binder.

FIG. 5 shows clearly that the nano-calcium carbonate is not segregated from the organic microparticles and is on the surface of the organic microparticles. It is easy to see that the pore volume in example 2, experiment 5 has been increased significantly in comparison with that in example 1, experiment 1.

A filter test was performed to illustrate the segregation tendency by preparing 200 mL of a slurry with 0.5 wt % solids content of the nanoparticle/microparticle mixture and filtering the slurry using a membrane filter with a pore diameter of 0.2 μm (pressure: about 25 mbar, water suction pump; room temperature). The time required to filter 200 mL was measured. When segregation occurs, nano-calcium carbonate first passes through the pores but over a period of time a secondary filter cake forms on the membrane filter and blocks the pores.
Filtering time: 1.5 hours.

The filtering time shows clearly that the segregation of nanoparticles and microparticles was reduced significantly. Almost no secondary filter cake of nano-calcium carbonate was formed on the membrane filter blocking the pores. The filtration time was very short due to the open structure of the composite in comparison with experiment 1 of example 1,

Experiment 6

Composite of 50 wt % Organic Microparticles 1 and 50 wt % Nano-Calcium Carbonate Composition 3

1457 g nano-calcium carbonate composition 3 was placed in a Pendraulik stirrer and 4047 g of the slurry of organic microparticles 1 was stirred into the composition. The solids content was diluted with water to a concentration of 40%. To this mixture was added 283.8 g binder 1 as an aqueous solution with a solids content of 15.4 wt % and diluted with distilled water to 30 wt %. The reaction mixture was stirred for 15 minutes, whereupon the pH was adjusted to 9 with 10 wt % NaOH at the start of the stirring time and the mixture was dispersed with 0.3 wt %, based on the total solids content of a 42 wt % active aqueous solution of a sodium salt of polyacrylic acid (Mw: about 4000 g/mol; pH 8.5), based on the total solids. The Pendraulik stirrer was equipped with a tooth disk having a diameter of 3.5 cm as the stirrer. The stirring speed was 7500 rpm. At the start the temperature was 22° C. During the 15-minute stirring, the temperature of the slurry rose to a final temperature of 42° C.

The resulting composite slurry had the following characteristics:
Brookfield viscosity measured after 5 min/60 min/120 min: 459/574/616 mPa·s
pH 9.03
Solids content: 28.9 wt %

Figure 6:
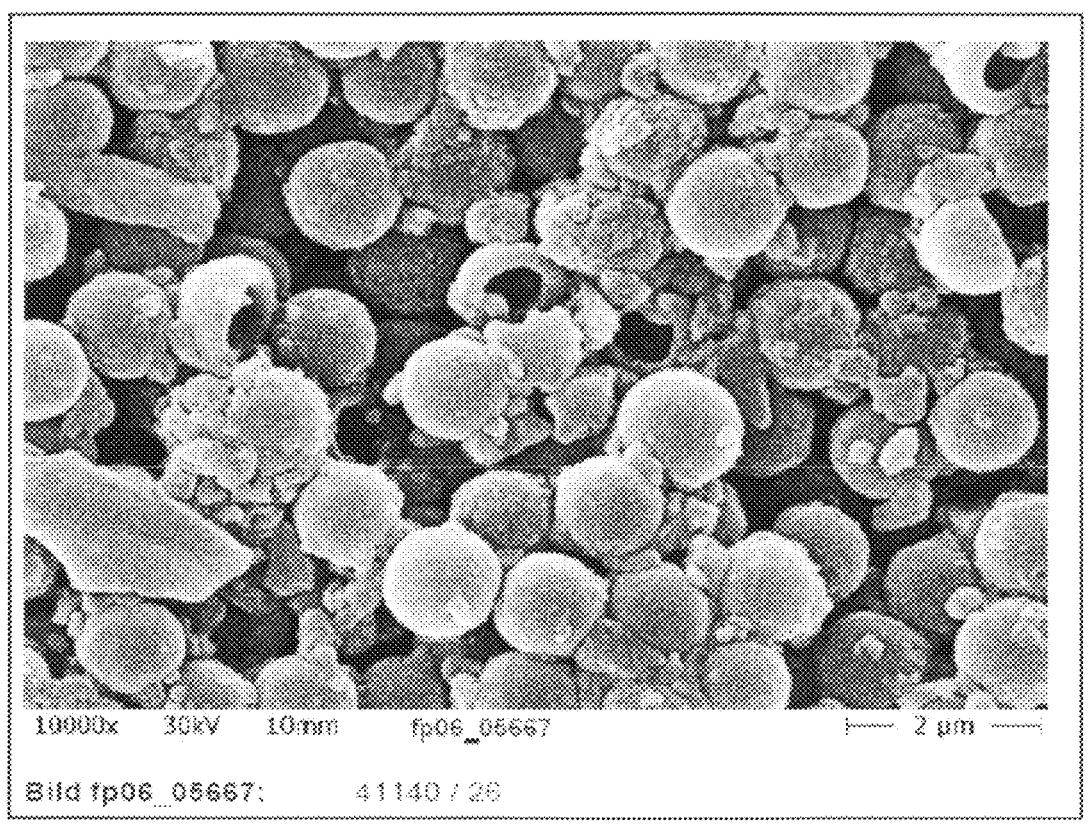
FIG. 6 shows the SEM of a preparation of another inventive composite of organic microparticles, nano-calcium carbonate and a binder.

FIG. 6 shows clearly that the nano-calcium carbonate is not segregated from the organic microparticles and is on the surface of the organic microparticles. It is easy to see that the pore volume in example 2, experiment 6 has been increased significantly in comparison with that in example 1, experiment 1.

Experiment 7

Composite of 9 wt % Organic Microparticles 1 and 91 wt % Nano-Calcium Carbonate Composition 4 a) Step 1: Producing an Intermediate of Nano-Calcium Carbonate Composition 4 with Binder 1

2500 g nano-calcium carbonate composition 4 was placed in a 1 L ploughshare mixer, Lödige brand, Germany, and 324.7 g aqueous solution of binder 1 was added within 10 minutes while the mixer was running and then homogenized for another 10 minutes. The solids content of the intermediate was 90.2 wt % after addition of binder 1 and the mixture had a solid powdery consistency.

b) Step 2. Producing the Composite of Nano-Calcium Carbonate Intermediate and Organic Microparticles 1

111 g of the slurry of microparticles 1 was placed in the Pendraulik stirrer and 332.6 g of the nano-calcium carbonate intermediate from step a) was added and diluted with water to a concentration of 46 wt %, and the components were thereby costructured.

The resulting composite slurry had the following characteristics:

Brookfield viscosity 2 hours after production: 795 mPa·s
pH 7.6
Solids content: 46.7 wt %

In comparison with the mixture, good surface coverage of the microparticles by nano-calcium carbonate was observed with the inventive composite in the scanning electron micrograph.

Experiment 8

Composite of 10 Wt % Organic Microparticles 2 and 90 Wt % Nano-Calcium Carbonate Composition 3

1800 g, based on the dry matter of the nano-calcium carbonate composition 3 was placed in the Pendraulik mixer and 200 g, based on the dry matter of the slurry of the organic microparticles 2, was stirred in over a period of 2 minutes. The solids content was diluted with water to a concentration of 50 wt %. Into this mixture was stirred 5.0 wt %, based on the total solids content of nanoparticles and microparticles, of binder 1 as an aqueous solution with a solids content of 15.4 wt %, over an additional 2 minutes and then the mixture was diluted with water to a solids content of 40 wt %. The resulting reaction mixture was sheared for 15 minutes, the pH was adjusted to 9 with 10 wt % NaOH after half of the shearing time and the mixture was dispersed with 1 wt %, based on the total solids content of a 40 wt % active aqueous solution of a sodium salt of polyacrylic acid (Mw: about 4000 g/mol, pH 8.5). The Pendraulik stirrer was equipped with a toothed disk having a diameter of 3.5 cm and the stirrer speed was 7500 rpm. The starting temperature was 23° C. and the final temperature after the 15 minutes shearing time was 42° C.

The resulting composite slurry had the following characteristics:

pH 9.0
Solids content: 40.9 wt %

Figure 7:
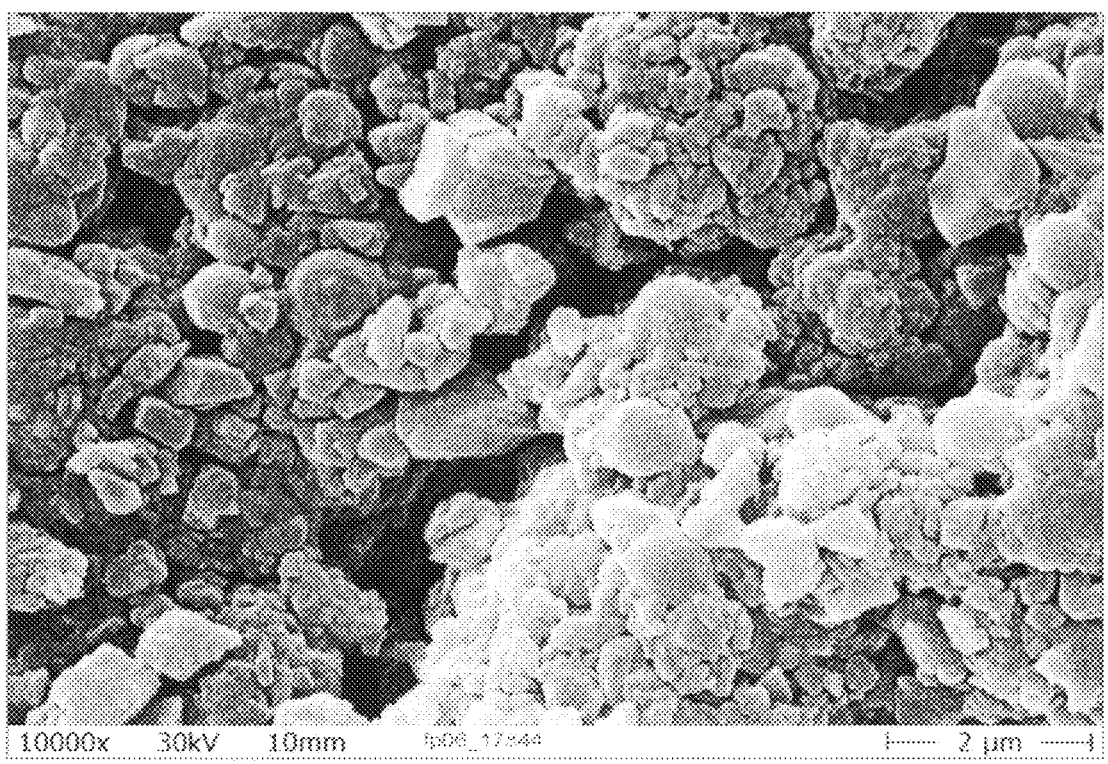
FIG. 7 shows the SEM of a preparation of another inventive composite of organic microparticles, nano-calcium carbonate and a binder.

FIG. 7 shows clearly that the nano-calcium carbonate is not segregated from the organic microparticles and is on the surface of the organic microparticles.

Example 3

Composites of Inorganic Microparticles, Nano-Calcium Carbonate Composition and Binder 1

Experiment 9

Composite of 50 Wt % Inorganic Microparticles 2 and 50 Wt % Nano-Calcium Carbonate Composition 1 a) Step 1: Preparing an Intermediate of Microparticles 2 with Binder 1

400 kg inorganic microparticles 2 were placed in a ploughshare mixer, model FKM 2000 D, Lödige, Germany, and 53.3 kg aqueous solution of binder 1 was added within 10 minutes with the stirrer running and then homogenized for another 10 minutes. The solids content of the intermediate was 88 wt % after adding the binder 1 and had a solid powder consistency.

b) Step 2: Preparing the Composite of Intermediate and Nano-Calcium Carbonate Composition 1

522.6 kg nano-calcium carbonate composition 1 and 388 kg water for a solids content of 41.63 wt % were mixed in a 2 m³ container. Then 8.9 kg of a 42 wt % active aqueous solution of a sodium salt of polyacrylic acid (Mw: about 4000 g/mol, pH 8.5) and 3 kg 10 wt % NaOH were added. The slurry was pumped with the help of a centrifugal pump through a tubular mixing apparatus and 427.5 kg of the intermediate product from step 1 with a solids content of 88 wt % was introduced continuously through an intake pipe at the side into the tubular mixing apparatus over a period of 2 minutes and the intermediate was brought in contact with the slurry. Then the resulting slurry was circulated again for 8 minutes.

Next the material was screened directly into a container through a 104 μm screen.

The resulting composite slurry had the following characteristics:

| 5 days after production: | Brookfield viscosity measured after 5 min/60 min/120 min: 76/75/77 mPa · s pH 8.65 Solids content: 58.6 wt % |
|---|---|

Figure 8:
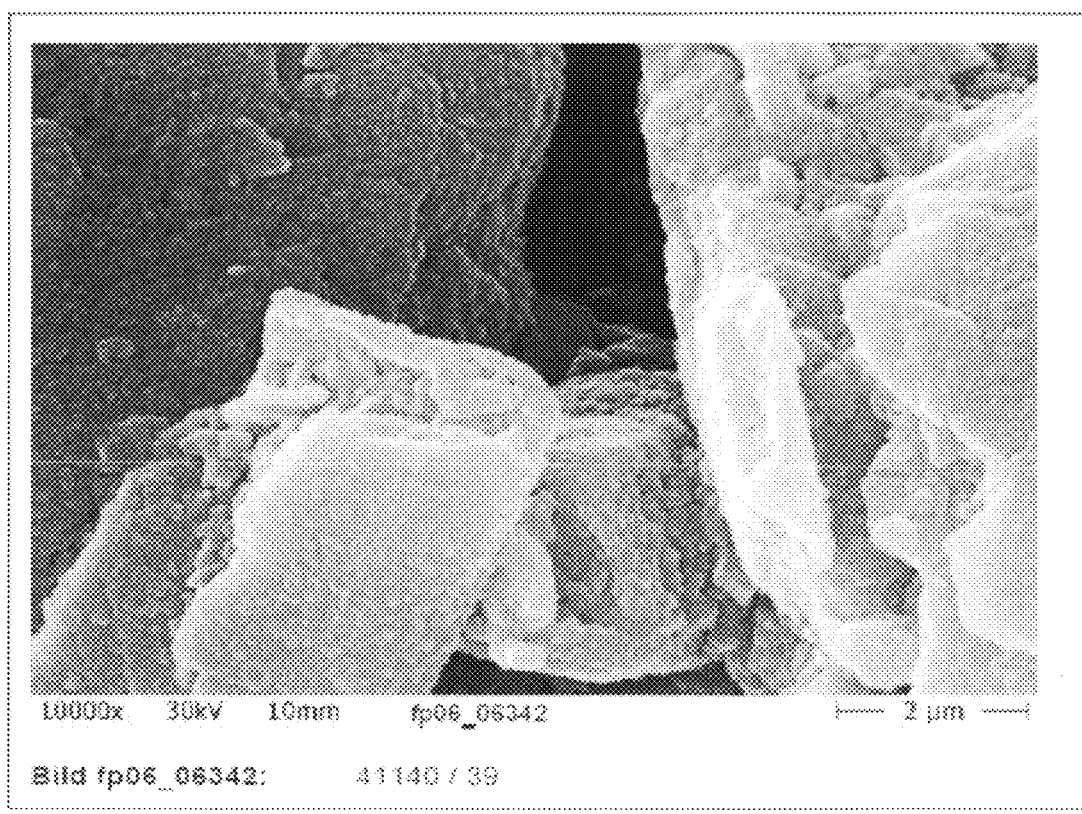
FIG. 8 shows the SEM of a preparation of another inventive composite of inorganic microparticles, nano-calcium carbonate and a binder.

It can be seen clearly from FIG. 8 that the nano-calcium carbonate is not segregated from the inorganic microparticles and is on the surface of the inorganic microparticles. It can readily be seen that the pore volume in example 3, experiment 9 has been increased significantly in comparison with that in example 1, experiment 4.

A filter test was performed to illustrate the segregation tendency by preparing 200 mL of the slurry with 0.5 wt % solids content of the nanoparticle/microparticle mixture and filtering the slurry using a membrane filter with a pore diameter of 0.2 Mm (pressure: about 25 mbar, water suction pump; room temperature). The time required to filter 200 mL was measured. When segregation occurs, nano-calcium carbonate first passes through the pores but over a period of time a secondary filter cake forms on the membrane filter and blocks the pores.

Filtering time: 6.0 Hours.

The filtering time shows clearly that the segregation of nanoparticles and microparticles was greatly reduced. Almost no secondary filter cake of nano-calcium carbonate is formed on the membrane filter, blocking the pores. The filtration time is very short owing to the open structure of the composite in comparison with experiment 4 of example 1.

Experiment 10

Composite of 50 Wt % Inorganic Microparticles 2 and 50 Wt % Nano-Calcium Carbonate Composition 2 a) Step 1: Preparing an Intermediate of Microparticles 2 with Binder 1

400 kg inorganic microparticles 2 were placed in a ploughshare mixer, model FKM 2000 D, Lödige, Germany and 53.3 kg aqueous solution of binder 1 was added within 10 minutes with the stirrer running and homogenized for another 10 minutes. The solids content of the intermediate was 88 wt % after adding the binder 1.

b) Step 2: Preparing the Composite of Intermediate and Nano-Calcium Carbonate Composition 2

518.3 kg nano-calcium carbonate composition 2 and 348 kg water were mixed in a 2 m$^3$ container. Then 3.6 kg of a 42 wt % active aqueous solution of a sodium salt of polyacrylic acid (Mw: about 4000 g/mol, pH 8.5) and 1.35 kg 10 wt % NaOH were added while stirring. The slurry was pumped with the help of a centrifugal pump through a tubular mixing apparatus and 424 kg of the intermediate from step 1 having a solids content of 88 wt % was added continuously to the tubular mixing apparatus from the side through an intake tube and mixed.

Then the mixture was screened directly into a container through a 104 μm screen.

The resulting composite slurry had the following characteristics:

| 5 days after production: | Brookfield viscosity measured after 5 min/60 min/120 min: 422/405/409 mPa · s pH 8.3 Solids content: 58.35 wt % |
|---|---|

Figure 9:
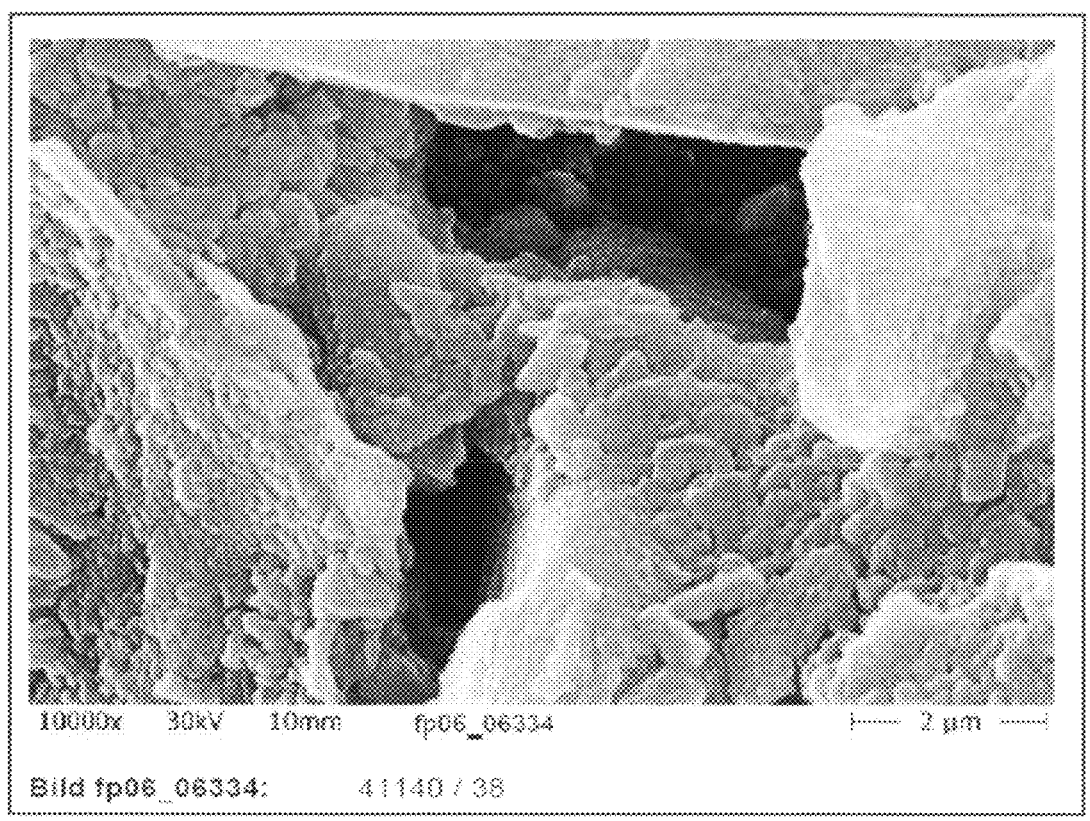
FIG. 9 shows the SEM of a preparation of another inventive composite of inorganic microparticles, nano-calcium carbonate and a binder.

FIG. 9 shows clearly that the nano-calcium carbonate is not segregated from the inorganic microparticles and is on the surface of the inorganic microparticles. It is easy to see that the pore volume in example 3, experiment 10 has been greatly increased in comparison with that in example 1, experiment 4.

A filter test was performed to illustrate the segregation tendency by preparing 200 mL of a slurry with 0.5 wt % solids content of the nanoparticle/microparticle mixture and filtering the slurry using a membrane filter with a pore diameter of 0.2 μm (pressure: about 25 mbar, water suction pump; room temperature). The time required to filter 200 mL was measured. When segregation occurs, nano-calcium carbonate first passes through the pores but over a period of time a secondary filter cake forms on the membrane filter and blocks the pores.

Filtering time: 2.5 Hours.

The filtering time shows clearly that the segregation of nanoparticles and microparticles was greatly reduced. Almost no secondary filter cake of nano-calcium carbonate is formed on the membrane filter, blocking the pores. The filtration time is very short owing to the open structure of the composite in comparison with experiment 4 of example 1.

Experiment 11

Composite of 25 Wt % Inorganic Microparticles 2 and 75 Wt % Nano-Calcium Carbonate Composition 2 a) Step 1: Preparing an Intermediate of Microparticles 2 with Binder 1

400 kg inorganic microparticles 2 were placed in a ploughshare mixer, model FKM 2000 D, Lödige, Germany and 53.3 kg aqueous solution of binder 1 was added within 10 minutes with the stirrer running and homogenized for another 10 minutes. The solids content of the intermediate was 88 wt % after adding the binder 1.

In a ploughshare mixer of the Lödige type, 77.5 kg nano-calcium carbonate composition 2 was placed first and mixed with 17.5 kg water. Then 180 g of 42 wt % aqueous solution of a sodium salt of polyacrylic acid (Mw: about 4000 g/mol, pH 8.5) was added and after a brief homogenization time of 2 minutes, 21.1 kg of the intermediate from step 1 with a solids content of 88 wt % was added and mixed thoroughly for 30 minutes using the two mixing units of the ploughshare mixer of the type FKM 130 D, the homogenizer and the ploughshare.

Then the mixture was screened directly into a container through a 104 μm screen.

The resulting composite slurry had the following characteristics:

| 5 days after production: | Brookfield viscosity: 108/109/112 mPa · s pH 8.86 Solids content: 64.76 wt % |
|---|---|

Figure 10:
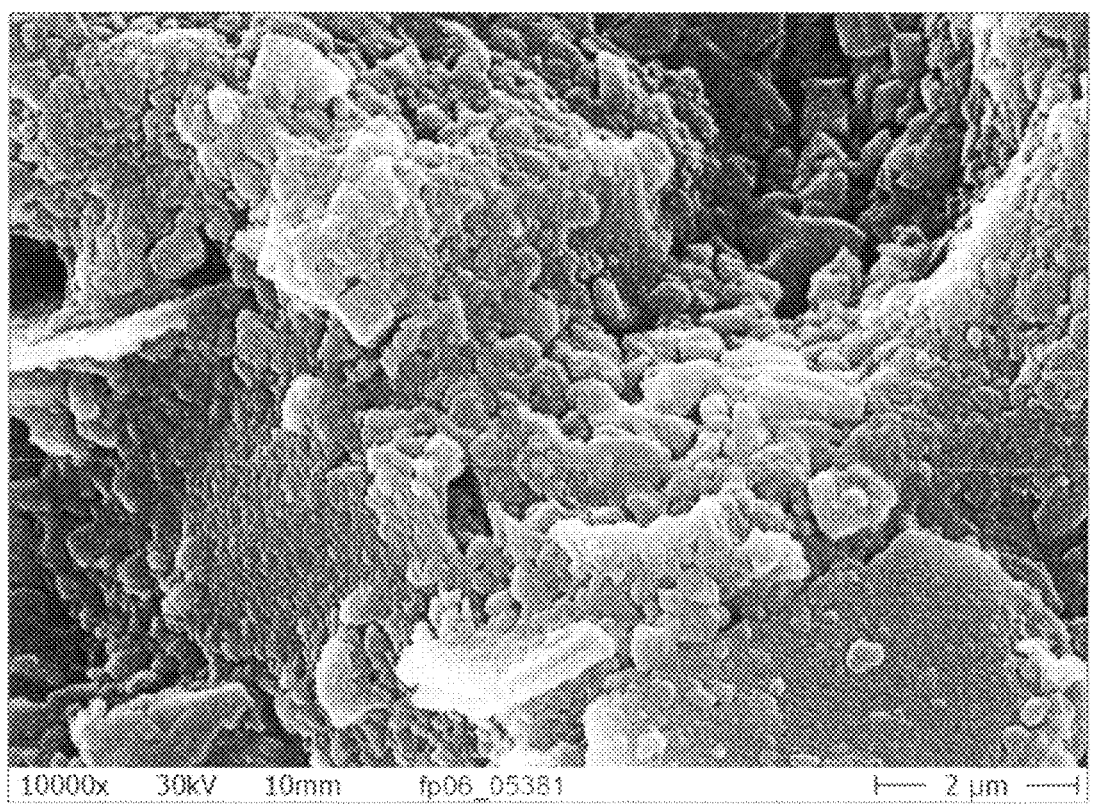
FIG. 10 shows the SEM of a preparation of another inventive composite of inorganic microparticles, nano-calcium carbonate and a binder.

It can be seen clearly from FIG. 10 that the nano-calcium carbonate is not segregated from the inorganic microparticles and is on the surface of the inorganic microparticles. It is easy to see that the pore volume in example 3, experiment 11 has been increased significantly in comparison with that in example 1, experiment 4.

This experiment shows that even a different type of equipment than that described so far and different addition points for pigments and/or fillers and binders leads to a good surface treatment of inorganic microparticles with nano-calcium carbonate particles.

Example 4

Composites of Organic Microparticles, Nano-Calcium Carbonate Composition 3 and Binder 2

Experiment 12

Composite of 25 Wt % Organic Microparticles 1 and 75 Wt % Nano-Calcium Carbonate Composition 3 and Binder 2

654.2 g organic microparticles 1 were placed in the Pendraulik stirrer, 17.6 g of a 20 wt % PolyDADMAC solution was added, stirred for 5 minutes then 23.5 g of binder 2 was added, stirred for 5 minutes, then 700 g of the nano-calcium carbonate composition 3 was added and diluted with distilled water to about 30 wt %. The resulting reaction mixture was sheared for 15 minutes, adjusting the pH to 9 with 10 wt % NaOH and dispersing the mixture with 16.8 g of a 42 wt % active aqueous solution of a sodium salt of polyacrylic acid (Mw: about 4000 g/mol, pH 8.5). The Pendraulik stirrer was equipped with a toothed disk with a diameter of 3.5 cm as the stirrer. The stirring speed was 7500 rpm. At the start the temperature was 23° C.

During the 15 minutes of stirring, the temperature of the slurry rose to a final temperature of 44° C.

The resulting composite slurry had the following characteristics:

Brookfield viscosity measured after 5 min/60 min/120 min: 317/338/358 mPa·s pH 9.26

Solids content: 32.0 wt %

Figure 11:
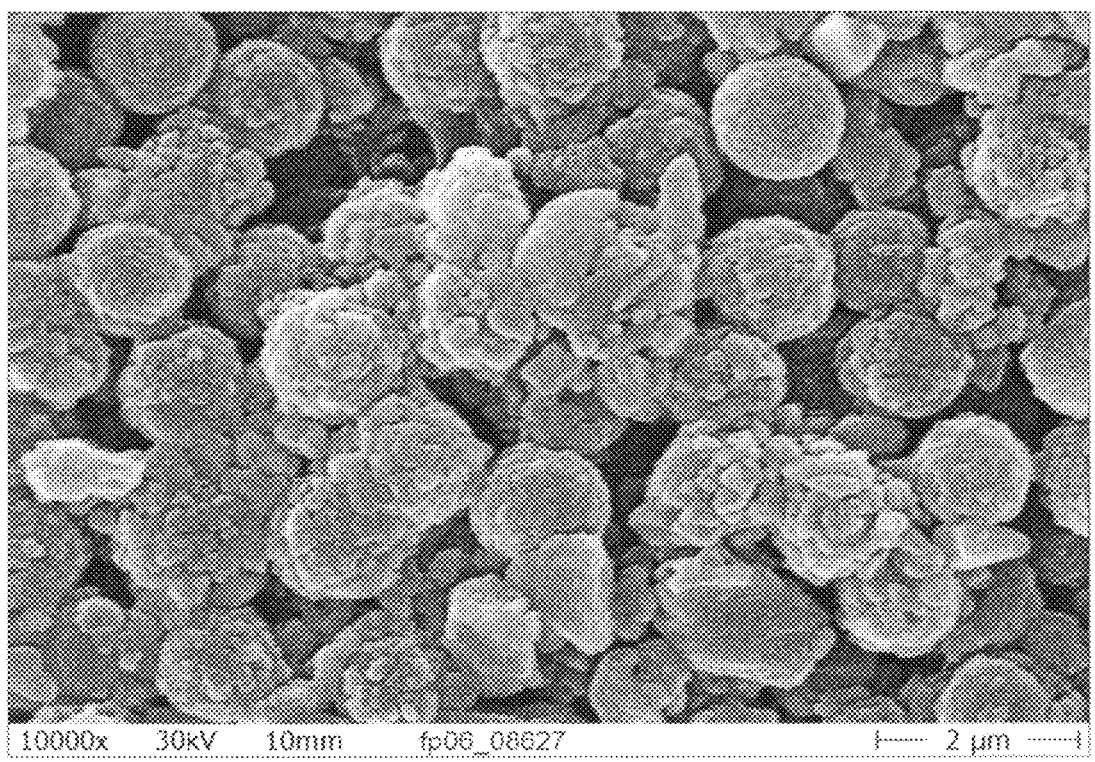
FIG. 11 shows the SEM of a preparation of another inventive composite of organic microparticles, nano-calcium carbonate and a binder.

FIG. 11 shows clearly that the nano-calcium carbonate is not segregated from the organic microparticles and is on the surface of the organic microparticles. It can readily be seen that the pore volume in example 4, experiment 12 has been increased significantly in comparison with that in example 1, experiment 1.

A filter test was performed to illustrate the segregation tendency by preparing 200 mL of the slurry with 0.5 wt % solids content of the nanoparticle/microparticle mixture and filtering the slurry using a membrane filter with a pore diameter of 0.2 µm (pressure: about 25 mbar, water suction pump; room temperature). The time required to filter 200 mL was measured. When segregation occurs, nano-calcium carbonate first passes through the pores but over a period of time a secondary filter cake forms on the membrane filter and blocks the pores.

Filtering Time: 13 Minutes

The extremely short filtering time shows clearly that the segregation of nanoparticles and microparticles was greatly reduced. Almost no secondary filter cake of nano-calcium carbonate is formed on the membrane filter, blocking the pores. The filtration time is extremely short owing to the open structure of the composite in comparison with experiment 1 of example 1.

Experiment Relating to Smearing and Drying of Ink on Coated Paper a) Smear Test on Uncalendered Paper Coating colours were prepared from the inventive composite of experiment 11 and from the mixture of the state of the art as described in experiment 1 with the following formulation:

A) 350 g of the dry composite of experiment 11 and 35 g dry weight of a styrene-acrylate latex (Acronal S 360 D; BASF)

were mixed together with shearing for 5 minutes at 200 rpm using a disk stirrer with a diameter of 5 cm to form a coating colour.

B) 500 g of a dry composite of experiment 1 and 50 g dry weight of a styrene-acrylate latex (Acronal S 360 D; BASF)

were mixed together with shearing for 5 minutes at 2000 rpm using a disk stirrer with a diameter of 5 cm to form a coating colour.

15 g dry weight of the coating colour was used to coat a 58 g/m² offset base paper such as Magnostar, Sappi. The coating was applied using an Erichsen desktop coater (doctor applicator; model 624). Depending on the size of the doctor blade, different amounts of the slurry prepared were placed in front of the doctor. Then at a speed setting of 5, the doctor blade was drawn over the paper to be coated. To prevent the doctor from rotating, the doctor blade should be held by hand on the left side without applying any pressure to the paper being coated.

Doctor blade no. 2 was used for the mixture from experiment 1 in order to achieve a coating weight of 15 g/m² and doctor blade no. 3 was used to achieve a coating weight of 22 g/m². Doctor blade no. 3 was used for the composite of experiment 11 to achieve a coating weight of 15 g/m².

After drying by using hot air at about 105° C. for 15 minutes, the paper was printed using an HP Deskjet 6540 inkjet printer and ink HP Tri Colour 344 and HP Black 339.

The drying speed of the ink was tested by using a FOGRA finger wipe tester at 30 Newtons. The FOGRA finger wipe tester was developed by and is available from the Forschungsgesellschaft Druck, Munich; it is a test device for determining the wipe resistance of the printing ink layer. With this test device, smearing of the inkjet print ink is determined after a defined period of time on a coated Magnostar standard paper. This simulates smearing of ink on the coating by hand, i.e., with a finger.

The coated paper strip was printed with a standard inscription. Then the printed surface was tested with the FOGRA finger wipe tester with the tester set at 30 Newtons with a 360° rotation.

The analysis is performed optically. A uniform coating without smearing is required.

Result:

| Time after printing | Experiment 11 (inventive) 15 g/m² | Experiment 1 (state of the art) | |
|---|---|---|---|
| | | 15 g/m² | 22 g/m² |
| 1 min | slight smearing | smearing | smearing |
| 3 min | no smearing | smearing | smearing |
| 5 min | no smearing | smearing | smearing |
| 10 min | no smearing | smearing | smearing |
| 16 h | no smearing | smearing | smearing |

This result shows clearly the improvement due to the invention. In the comparative experiment from the state of the art, even an increase in the coating weight was unable to yield an improvement in the drying rate b) Print Test on Calendered Paper A paper sample with an area of 5×10 cm coated as described in a) was calendered and printed under the above conditions.

Calendering Conditions:

Laboratory Dixon calender model 8000

Roll temperature: 90° C.

Calendering pressure: 40 bar 4 nips (4 passes)

Result:

In the print test in this case special attention was paid to the running of black ink on a substrate that had already been printed yellow. The analysis is performed visually after 1 hour without any additional enlargement.

| Experiment 11 (inventive) 15 g/m² | Experiment 1 (state of the art) 22 g/m² |
|---|---|
| No visible running No visible smearing of letters and numbers | Severe running Severe smearing of letters and numbers, not sharp |

This result shows clearly the improvement due to the present invention also with regard to print quality without any external influence on the calendered paper.

The invention claimed is:

1. A composite, comprising inorganic and/or organic pigment and/or filler particles coated at least partially with a composition comprising calcium carbonate particles, and a binder, wherein
the spherical equivalent diameter of the pigment and/or filler particles is in the micrometer range and the spherical equivalent diameter of the calcium carbonate particles is in the nanometer range; and
the binder is a copolymer comprising as monomers one or more dicarboxylic acids and one or more monomers from the group of diamines, triamines, dialkanolamines or trialkanolamines,
wherein the binder facilitates adhesion of the calcium carbonate particles to the surface of the pigment and/or filler particles, wherein the inorganic particles comprise talc, mica or a mixture thereof, and wherein the composite contains 0.1 to 10 wt% of the binder based on the total dry weight of the composite.

2. The composite according to claim 1, wherein the pigment and/or filler particles are inorganic particles comprising talc, mica or a mixture thereof.

3. The composite according to claim 1, wherein the pigment and/or filler particles are organic particles.

4. The composite according to claim 3, wherein the pigment and/or filler particles comprise polyethylene, polypropylene, polyethylene terephthalate or polystyrene.

5. The composite according to claim 1, wherein the pigment and/or filler particles have an essentially spherical structure.

6. The composite according to claim 1, wherein the pigment and/or filler particles have a hollow spherical or hollow hemispherical or platelet-like structure.

7. The composite according to claim 1, wherein the spherical equivalent diameter of the pigment particles and/or filler particles is more than 0.2 to about 100 µm.

8. The composite according to claim 1, wherein the spherical equivalent diameter of the pigment particles and/or filler particles is 0.3 to 12 µm.

9. The composite according to claim 3, wherein the spherical equivalent diameter of the organic pigment particles and/or filler particles is more than 0.2 to 25 µm.

10. The composite according to claim 3, wherein the spherical equivalent diameter of the organic pigment particles and/or filler particles is 0.25 to 1.5 µm.

11. The composite according to claim 1, wherein the pigment particles and/or filler particles comprise polystyrene.

12. The composite according to claim 11, wherein the pigment particles and/or filler particles are in the form of polystyrene hollow spheres with a spherical equivalent diameter of 0.25 to 1.5 µm.

13. The composite according to claim 1, wherein the calcium carbonate is synthetic precipitated calcium carbonate.

14. The composite according to claim 13, wherein the precipitated calcium carbonate has a vateritic, calcitic or aragonitic crystal structure.

15. The composite according to claim 1, wherein the calcium carbonate is ground natural calcium carbonate.

16. The composite according to claim 15, wherein the ground calcium carbonate is marble, limestone or chalk.

17. The composite according to claim 1, wherein 92 to 99% of the calcium carbonate particles, based on the amount N of the calcium carbonate particles, have a spherical equivalent diameter in a range from 20 to 200 nm.

18. The composite according to claim 1, wherein the calcium carbonate is ground to the spherical equivalent diameter in one or more dry or wet grinding steps.

19. The composite according to claim 18, wherein a ball mill, a jet plate mill, an attritor mill or combinations of such mills or combinations of one or more of such mills with a cyclone and screen is/are used for the grinding.

20. The composite according to claim 18, wherein the dry grinding is performed in a ball mill using iron and/or porcelain balls with a diameter of 0.5 to 10 cm.

21. The composite according to claim 18, wherein the dry grinding is performed in a ball mill using iron-cylpebs with a diameter of 2.5 cm.

22. The composite according to claim 18, wherein the wet grinding is performed in an attritor mill using grinding balls made of zirconium silicate, zirconium dioxide and/or baddeleite with a diameter of 0.2 to 5 mm.

23. The composite according to claim 18, wherein the wet grinding is performed in an attritor mill using grinding balls made of zirconium silicate, zirconium dioxide and/or baddeleite with a diameter of 0.2 to 2 mm.

24. The composite according to claim 18, wherein the wet grinding is performed in an attritor mill using grinding balls made of zirconium silicate, zirconium dioxide and/or baddeleite with a diameter of 0.5 to 5 mm.

25. The composite according to claim 18, wherein the wet grinding is performed in an attritor mill using grinding balls made of zirconium silicate, zirconium dioxide and/or baddeleite with a diameter of 0.5 to 2 mm.

26. The composite according to claim 15, wherein the natural ground calcium carbonate is dispersed and/or ground in the form of an aqueous slurry with a calcium carbonate solids content of more than 10 wt %.

27. The composite according to claim 15, wherein the natural ground calcium carbonate is dispersed and/or ground in the form of an aqueous slurry with a calcium carbonate solids content of more than 15 to 30 wt %.

28. The composite according to claim 15, wherein the natural ground calcium carbonate is dispersed and/or ground in the form of an aqueous slurry with a calcium carbonate solids content of 72 to 80 wt %.

29. The composite according to claim 15, wherein the calcium carbonate dispersed and/or ground in the form of an aqueous slurry with a calcium carbonate solids content of ≦60 wt %, is physically concentrated by filter pressing and/or centrifuging and/or thermally, or by combinations of mechanical and thermal concentration steps, optionally dispersed in the presence of one or more dispersants, to a final concentration of between 65 wt % and 78 wt %.

30. The composite according to claim 15, wherein the calcium carbonate dispersed and/or ground in the form of an aqueous slurry with a calcium carbonate solids content of ≦60 wt %, is physically concentrated by filter pressing and/or centrifuging and/or thermally, or by combinations of mechanical and thermal concentration steps, optionally dispersed in the presence of one or more dispersants, to a final concentration of 72±2 wt %.

31. The composite according to claim 14, wherein the natural ground calcium carbonate is dispersed and/or ground in the presence of one or more grinding aids and/or dispersants.

32. The composite according to claim 31, wherein the grinding aids and/or dispersants are anionic grinding aids and/or dispersants.

33. The composite according to claim 32, wherein the anionic grinding aids and/or dispersants comprise homopolymers or copolymers of polycarboxylic acid salts based on acrylic acid, methacrylic acid, maleic acid, fumaric acid, itaconic acid or mixtures thereof, or sodium polyphosphates, sodium citrate or mixtures thereof.

34. The composite according to claim 33, wherein the homopolymers or copolymers of polycarboxylic acid salts are partially or completely neutralized with sodium, lithium, potassium, ammonium, calcium, magnesium, strontium and/or aluminium or mixtures thereof.

35. The composite according to claim 33, wherein the homopolymers or copolymers of polycarboxylic acid salts are partially or completely neutralized with sodium and magnesium.

36. The composite according to claim 31, wherein the dispersants and/or grinding aids are used in wet grinding in an amount of about 0.05 to about 2 wt %.

37. The composite according to claim 31, wherein the viscosity of the calcium carbonate slurry in wet grinding is less than 2500 mPa·s.

38. The composite according to claim 31, wherein the viscosity of the calcium carbonate slurry in wet grinding is in the range of 50 to 250 mPa·s.

39. The composite according to claim 31, wherein the grinding aids and/or dispersants comprise a glycol, a polyglycol, a polyethylene glycol, an ethylene oxide-propylene oxide-ethylene oxide block copolymer, an alkanolamine, triethanolamine, triisopropanolamine or mixtures thereof.

40. The composite according to claim 31, wherein the dispersants and/or grinding aids in dry grinding are present in an amount of 0.2 to 1 mg/m² nanoparticle surface area.

41. The composite according to claim 1, containing 5 to 95 wt % of pigment particles and/or filler particles, based on the total dry weight of the composite.

42. The composite according to claim 1, containing 20 to 80 wt % of pigment particles and/or filler particles, based on the total dry weight of the composite.

43. The composite according to claim 1, containing 95 to 5 wt % of calcium carbonate particles, based on the total dry weight of the composite.

44. The composite according to claim 1, containing 80 to 20 wt % of calcium carbonate particles, based on the total dry weight of the composite.

45. The composite according to claim 1, wherein one or more saturated or unsaturated, branched or unbranched $C_2$ to $C_{10}$ dicarboxylic acid, $C_3$ to $C_9$ dicarboxylic acid, $C_4$ to $C_8$ dicarboxylic acid, $C_5$ to $C_7$ dicarboxylic acid, or adipic acid is used as one or more dicarboxylic acid monomers of the binder.

46. The composite according to claim 1, wherein one or more linear and branched chain, substituted and unsubstituted diamine and triamine and dialkanolamine and trialkanolamine, N-(2-aminoethyl)-1,2-ethanediamine, diethanolamine, an N-alkyldialkanolamine, N-methyl- and N-ethyldiethanolamine and triethanolamine is used as the one or more diamine, triamine, dialkanolamine or trialkanolamine monomer of the binder.

47. The composite according to claim 1, the copolymer used as the binder is crosslinked with epichlorohydrin.

48. The composite according to claim 1, wherein the binder is a copolymer of adipic acid with N-(2-aminoethyl)-1,2-ethanediamine and epichlorohydrin.

49. The composite according to claim 1, containing 0.3 to 5 wt % of binder, based on the total dry weight of the composite.

50. An aqueous slurry comprising the composite according to claim 1.

51. A filler or pigment comprising the composite according to claim 1 or an aqueous slurry thereof as a filler or pigment, but not in the production or processing of thermal paper, when the pigment and/or filler particles are organic pigment and/or filler particles.

52. Paper comprising the composite of claim 1 or an aqueous slurry thereof in an amount of 0.5 to 50 wt %, based on the total weight of the paper.

53. Paper comprising the composite of claim 1 or an aqueous slurry thereof as a coating in an amount of 2 to 50 wt % per side of paper.

54. The paper according to claim 53, wherein the composite is used in the pre-coating, the intermediate coating, the top coating and/or a single coating, and the paper is coated on one or both sides and one or more of the coatings contains the composite on one or both sides.

55. The paper according to claim 52, wherein the composite is used in calendered or uncalendered paper.

56. The paper according to claim 52, wherein the composite is used for modifying or controlling the pore volume of the paper or the coating.

57. Paints, plastics or sealing compounds comprising the composite according to claim 1 or an aqueous slurry thereof.

58. A filtration aid in the form of a filter layer comprising the composite according to claim 1 or an aqueous slurry thereof, optionally on a natural and/or synthetic carrier material such as cotton, cellulose and polyamide fibres.

59. A filtration aid comprising the composite according to claim 1 or an aqueous slurry thereof.

60. A filler comprising the composite according to claim 1 or an aqueous slurry thereof.

61. A pigment comprising the composite according to claim 1 or an aqueous slurry thereof.

62. A coating colour comprising the composite of claim 1 or an aqueous slurry thereof, but not for use in production or processing of thermal paper, when the pigment and/or filler particles are organic pigment and/or filler particles.

63. The coating colour according to claim 62, wherein the coating colour has a solids content of 25 to 75 wt % solids.

64. The coating colour according to claim 62, wherein the amount of the composite, based on the total solids content in the coating colour, is 3 to 97 wt %.

65. Inorganic and/or organic pigment and/or filler particles at least partially coated with (i) a copolymer comprising as monomers one or more dicarboxylic acids and one or more monomers from the group of diamines, triamines, dialkanolamines or trialkanolamines, wherein the inorganic and/or organic pigment and/or filler particles have a spherical equivalent diameter in the micrometer range, and wherein the inorganic particles comprise talc, mica or a mixture thereof, and (ii) a composition comprising calcium carbonate particles with a spherical equivalent diameter in the nanometer range, wherein the copolymer facilitates adhesion of the calcium carbonate particles to the surface of the pigment and/or filler particles, and wherein the composite contains 0.1 to 10 wt% of the binder based on the total dry weight of the composite.

66. The inorganic and/or organic pigment and/or filler particles according to claim 65, wherein the copolymer comprises as monomers adipic acid, N-(2-aminoethyl)-1,2-ethanediamine and epichlorohydrin.

67. The composite of claim 1, which is prepared by (a) homogenizing a combination of the pigment and/or filler particles, the calcium carbonate particles and the binder, (b) homogenizing a combination of the pigment and/or filler particles and the binder, which is then combined with the calcium carbonate particles and mixed, or (c) homogenizing a combination of the calcium carbonate particles and the binder, which is then combined with the pigment and/or filler particles and mixed, wherein the combination of the pigment and/or filler particles, the calcium carbonate particles and the binder in (a) is prepared by (i) mixing the pigment and/or filler particles, the calcium carbonate particles and the binder, (ii) mixing the pigment and/or filler particles and the binder, which is then combined with the calcium carbonate particles and mixed; (iii) mixing the pigment and/or filler particles and the calcium carbonate particles, which is then combined with the binder and mixed, or (iv) mixing the calcium carbonate particles and the binder, which is then combined with the pigment and/or filler particles and mixed.

68. The composite according to claim 1, wherein the pigment and/or filler particles are inorganic particles comprising talc.

69. The pigment and/or filler particles according to claim 65, wherein the pigment and/or filler particles are inorganic particles comprising talc, mica or a mixture thereof.

70. The pigment and/or filler particles according to claim 65, wherein the pigment and/or filler particles are inorganic particles comprising talc.

71. The pigment and/or filler particles according to claim 65, wherein the pigment and/or filler particles are organic particles.

72. The pigment and/or filler particles according to claim 71, wherein the pigment and/or filler particles comprise polyethylene, polypropylene, polyethylene terephthalate or polystyrene.

73. The pigment and/or filler particles according to claim 71, wherein the pigment particles and/or filler particles comprise polystyrene.

74. The composite according to claim 63, containing 0.5 to 3 wt% of binder, based on the total dry weight of the composite.

* * * * *